US009459748B2

(12) United States Patent
Hashimoto et al.

(10) Patent No.: US 9,459,748 B2
(45) Date of Patent: Oct. 4, 2016

(54) CAPACITANCE TYPE TOUCH PANEL, MANUFACTURING METHOD OF THE SAME, AND INPUT DEVICE

(71) Applicant: FUJIFILM Corporation, Tokyo (JP)

(72) Inventors: Akihiro Hashimoto, Kanagawa (JP); Yuki Matsunami, Kanagawa (JP); Nobuyuki Tada, Kanagawa (JP); Yasushi Endo, Kanagawa (JP); Kentaro Okazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/582,406

(22) Filed: Dec. 24, 2014

(65) Prior Publication Data

US 2015/0169111 A1    Jun. 18, 2015

Related U.S. Application Data

(63) Continuation of application No. PCT/JP2013/068379, filed on Jul. 4, 2013.

(30) Foreign Application Priority Data

Jul. 6, 2012   (JP) ................................ 2012-153131
Sep. 25, 2012  (JP) ................................ 2012-210771

(51) Int. Cl.
    *G06F 3/044*      (2006.01)
(52) U.S. Cl.
    CPC ..... *G06F 3/044* (2013.01); *G06F 2203/04103* (2013.01); *G06F 2203/04111* (2013.01); *G09G 2300/0421* (2013.01)

(58) Field of Classification Search
    None
    See application file for complete search history.

(56) References Cited

U.S. PATENT DOCUMENTS

2004/0239641 A1\* 12/2004 Takahata ............. G02F 1/13338
                                                       345/173
2010/0092769 A1\*  4/2010 Shoji ........................ G01T 1/00
                                                       428/337

FOREIGN PATENT DOCUMENTS

JP        11296287 A     10/1999
JP      2003-157149 A     5/2003
JP      2004-030317 A     1/2004

OTHER PUBLICATIONS

International Preliminary Report on Patentability and Written Opinion, mailed Jan. 15, 2015, issued in corresponding International Application No. PCT/JP2013/068379, 8 pages in English.

(Continued)

*Primary Examiner* — Dwayne Bost
*Assistant Examiner* — Christopher Kohlman
(74) *Attorney, Agent, or Firm* — Sughrue Mion, PLLC

(57) ABSTRACT

A capacitance type touch panel includes: an insulating layer; a plurality of electrode portions; a plurality of lead-out wiring portions; a transparent resin layer; and a substrate disposed on the transparent resin layer, wherein at least on the surface of the peripheral edge of the transparent resin layer exposed between the insulating layer and the substrate and on the exposed surface of the lead-out wiring portions, a sealing layer is disposed, and the sealing layer has a moisture vapor transmittance equal to or less than 20 g/m$^2$/24 h/atm (25° C., 90% RH, 25 μm), and has a thickness equal to or greater than 1.0 μm.

20 Claims, 8 Drawing Sheets

(56) References Cited

OTHER PUBLICATIONS

International Search Report for PCT/JP2013/068379 dated Sep. 17, 2013.

Communication dated May 23, 2016, issued by the Korean Intellectual Property Office in corresponding Korean Application No. 10-2014-7037126.

* cited by examiner

CAPACITANCE TYPE TOUCH PANEL, MANUFACTURING METHOD OF THE SAME, AND INPUT DEVICE

CROSS-REFERENCE TO RELATED APPLICATIONS

This application is a Continuation of PCT International Application No. PCT/JP2013/068379 filed on Jul. 4, 2013, which claims priority under 35 U.S.C. §119(a) to Japanese Application No. 2012-153131 filed on Jul. 6, 2012 and Japanese Application No. 2012-210771 filed on Sep. 25, 2012. Each of the above application(s) is hereby expressly incorporated by reference, in its entirety, into the present application.

BACKGROUND OF THE INVENTION

The present invention relates to a capacitance type touch panel, and particularly relates to a capacitance type touch panel having a sealing layer that exhibits predetermined characteristics.

The present invention also relates to a manufacturing method of a capacitance type touch panel and to an input device.

As types of touch panels, a resistive film type touch panel, an optical sensor type touch panel, and the like are known. Particularly, in recent years, capacitance type touch panels that detect a change in capacitance have been widely used.

However, touch panels have a problem in that operation failure easily occurs due to the influence of external environments. Therefore, for example, for resistive film type touch panels, the following countermeasure is taken.

JP 2004-30317 A (particularly, see FIG. 6) discloses a method of forming a lateral end-reinforcing layer 28 by coating an epoxy resin onto the surface of the lateral end portion of a resistive film type touch panel, so as to prevent moisture and chemicals from penetrating the touch panel from the outside and to prevent softening of a transparent adhesive layer.

Furthermore, JP 2003-157149 A (particularly, FIG. 9) discloses a method of forming a sealing layer 21 by coating a sealing material for covering the periphery of the end portion of an upper electrode plate 1 or a lower electrode plate 3 of a touch panel, so as to prevent penetration of moisture and to prevent deterioration of an adhesive layer 5.

SUMMARY OF THE INVENTION

In recent years, as the environment in which touch panels are used has been expanded, even for capacitance type touch panels, inhibition of the occurrence of operation failure caused by the influence of moisture has been required, and further, inhibition of the occurrence of operation failure caused by the influence of salt water has also been required.

However, with the methods described in JP 2004-30317 A and JP 2003-157149 A, the influence of salt water on the capacitance type touch panel could not be sufficiently inhibited.

Moreover, even though a further improvement of the yield of the capacitance type touch panel is required, the prior art is not necessarily satisfactory in this regard.

The present invention has been made in consideration of the above circumstances, and an object thereof is to provide a capacitance type touch panel in which the occurrence of operation failure is inhibited even before and even after a salt water test and which is excellent in yield.

As a result of performing an extensive examination to achieve the aforementioned object, the present inventors found that operation failure occurring after a salt water test is caused by a variation in insulation resistance between lead-out wiring portions of a capacitance type touch panel. Particularly, they found that ionic substances ($Na^+$ or $Cl^-$) in salt water used in the salt water test exert a great influence. Based on the findings, they continued examination, and as a result, they found that the aforementioned object can be achieved by the following constitution.

(1) A capacitance type touch panel comprising:

an insulating layer;

a plurality of electrode portions disposed on the main surface of at least one side of the insulating layer;

a plurality of lead-out wiring portions which is disposed on the main surface of the insulating layer in which the plurality of electrode portions is disposed, and in each which one end is connected to the corresponding electrode portion;

a transparent resin layer disposed on the electrode portions and the lead-out wiring portions, such that the other end of each of the lead-out wiring portions is exposed; and a substrate disposed on the transparent resin layer, wherein at least on the surface of the peripheral edge of the transparent resin layer exposed between the insulating layer and the substrate and on the exposed surface of the lead-out wiring portions, a sealing layer is disposed, and the sealing layer has a moisture vapor transmittance equal to or less than 20 g/m²/24 h/atm (25° C., 90% RH, 25 μm), and has a thickness equal to or greater than 1.0 μm.

(2) The capacitance type touch panel according to (1), comprising:

an insulating layer;

a plurality of first electrode portions disposed on the surface of the insulating layer;

a plurality of first lead-out wiring portions which is disposed on the surface of the insulating layer and in each of which one end is connected to the corresponding first electrode portion;

a first transparent resin layer disposed on the first electrode portions and the first lead-out wiring portions, such that the other end of each of the first lead-out wiring portions is exposed;

a first protective substrate disposed on the first transparent resin layer;

a plurality of second electrode portions disposed on the rear surface of the insulating layer;

a plurality of second lead-out wiring portions which is disposed on the rear surface of the insulating layer and in each of which one end is connected to the corresponding second electrode portion;

a second transparent resin layer disposed on the second electrode portions and the second lead-out wiring portions, such that the other end of each of the second lead-out wiring portions is exposed; and a second protective substrate disposed on the second transparent resin layer, wherein at least on the surface of the peripheral edge of the first transparent resin layer exposed between the insulating layer and the first protective substrate, on the surface of the peripheral edge of the second transparent resin layer exposed between the insulating layer and the second protective substrate, and on the exposed surfaces of the first lead-out wiring portions and the second lead-out wiring portions, a sealing layer is disposed, and the sealing layer has a moisture vapor transmittance equal to or less than 20 g/m²/24 h/atm (25° C., 90% RH, 25 μm) and a thickness equal to or greater than 1.0 μm.

(3) The capacitance type touch panel according to (1) or (2), wherein the sealing layer contains a fluorine-based resin.

(4) The capacitance type touch panel according to any of (1) to (3), wherein the sealing layer contains fluorine atoms in an amount equal to or greater than 1% by mass.

(5) The capacitance type touch panel according to any of (1) to (4), wherein the sealing layer is a layer formed of a composition for forming a sealing layer, and the composition for forming a sealing layer has a surface tension equal to or less than 20 mN/m and a viscosity equal to or less than 100 cps.

(6) An input device comprising the capacitance type touch panel according to any of (1) to (5).

(7) A manufacturing method of the capacitance type touch panel according to any of (2) to (5), comprising a step of:

bringing a laminate into contact with a sealant-containing composition for forming a sealing layer, wherein the laminate includes an insulating layer, a plurality of first electrode portions disposed on the surface of the insulating layer, a plurality of first lead-out wiring portions which is disposed on the surface of the insulating layer and in each of which one end is connected to the corresponding first electrode portion, a first transparent resin layer disposed on the first electrode portions and the first lead-out wiring portions such that the other end of each of the first lead-out wiring portions is exposed, a first protective substrate disposed on the first transparent resin layer, a first protective film removably disposed on the main surface of the first protective substrate, a plurality of second electrode portions disposed on the rear surface of the insulating layer, a plurality of second lead-out wiring portions which is disposed on the rear surface of the insulating layer and in each of which one end is connected to the corresponding second electrode portion, a second transparent resin layer disposed on the second electrode portions and the second lead-out wiring portions such that the other end of each of the second lead-out wiring portions is exposed, a second protective substrate disposed on the second transparent resin layer, and a second protective film removably disposed on the main surface of the second protective substrate.

(8) The manufacturing method of the capacitance type touch panel according to (7), wherein the laminate is brought into contact with the composition by a spray treatment, a dipping treatment, or dispensing.

(9) A capacitance type touch panel comprising:

an insulating layer;

a plurality of electrode portions disposed on the main surface of at least one side of the insulating layer, a plurality of lead-out wiring portions which is disposed on the main surface of the insulating layer in which the plurality of electrode portions is disposed, and in each of which one end is connected to the corresponding electrode portion;

a transparent resin layer disposed on the electrode portions and the lead-out wiring portions, such that the other end of each of the lead-out wiring portions is exposed; and a substrate disposed on the transparent resin layer, wherein a direct current resistance between the lead-out wiring portions adjacent to each other that is measured 24 hours after a salt water spray test of JIS Z 2371 is equal to or a greater than 300 kΩ.

(10) The capacitance type touch panel according to (9), wherein at least on the surface of the peripheral edge of the transparent resin layer exposed between the insulating layer and the substrate and on the exposed surface of the lead-out wiring portions, a sealing layer is disposed, and the sealing layer has a moisture vapor transmittance equal to or less than 20 g/m$^2$/24 h/atm (25° C., 90% RH, 25 µm) and a thickness equal to or greater than 1.0 µm.

(11) The capacitance type touch panel according to (9) or (10), wherein the lead-out wiring portions contain silver.

(12) The capacitance type touch panel according to any of (9) to (11), wherein the electrode portions are transparent electrode portions comprising a metal oxide.

(13) The capacitance type touch panel according to any of (9) to (11), wherein the electrode portions are transparent electrode portions comprising metal nanowires having an average wire diameter equal to or less than 50 nm and an average wire length equal to or greater than 5 µm.

According to the present invention, it is possible to provide a capacitance type touch panel in which the occurrence of operation failure is inhibited even before and even after a salt water test and which is excellent in yield.

DETAILED DESCRIPTION OF THE INVENTION

Hereinafter, preferable embodiments of the capacitance type touch panel of the present invention will be described with reference to drawings.

First Embodiment

Figure 1A:
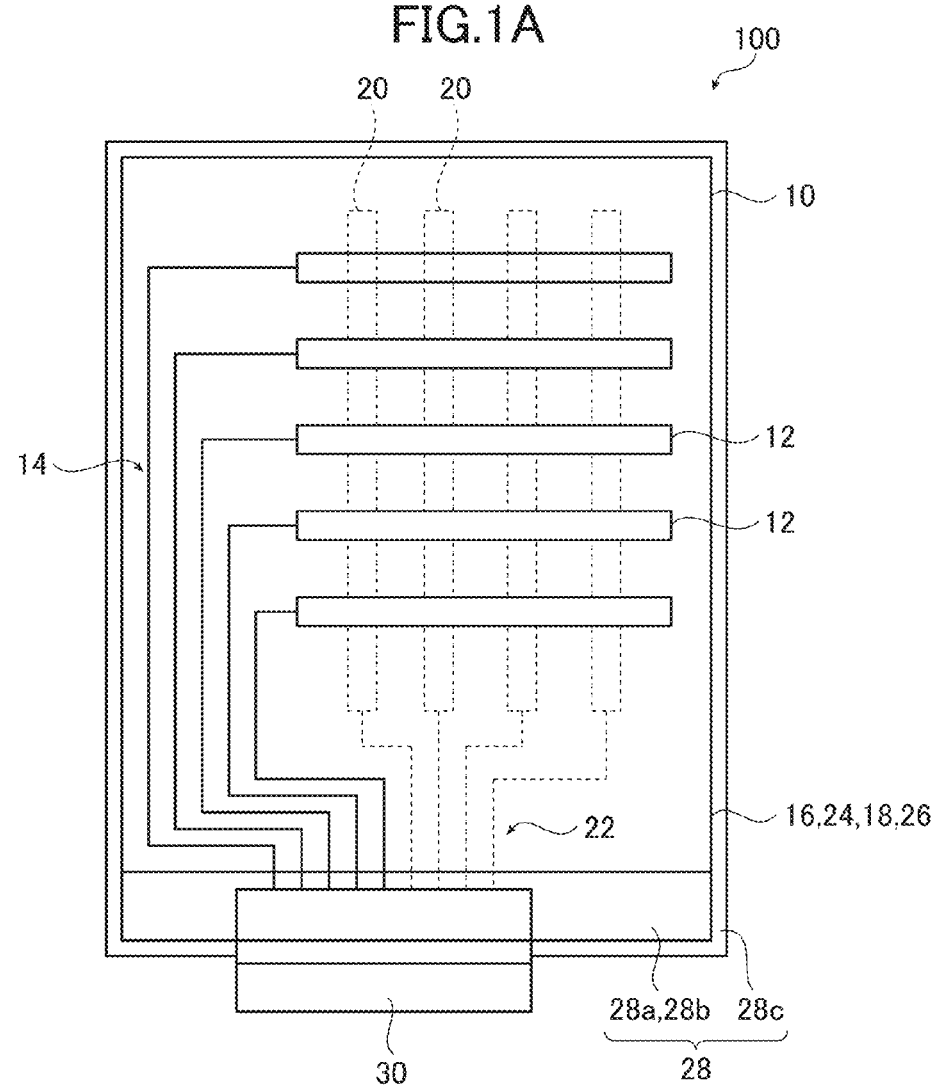
FIG. 1A is a plan view of a first embodiment of a capacitance type touch panel of the present invention.
Figure 1B:
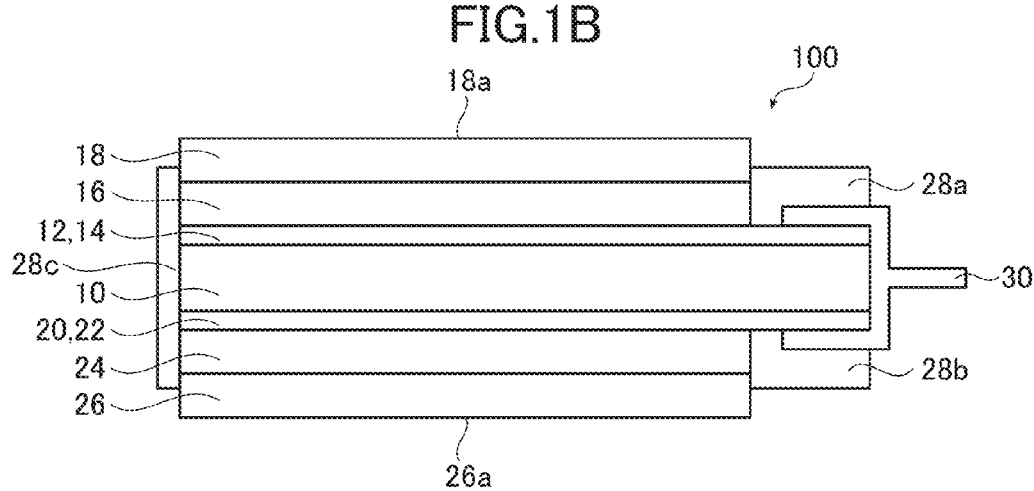
FIG. 1B is a cross-sectional view thereof.

FIGS. 1A and 1B are schematic views of a first embodiment of the capacitance type touch panel of the present invention. FIG. 1A is a plan view of a capacitance type touch panel 100, and FIG. 1B is a cross-sectional view thereof. Herein, FIG. 1B is merely a schematic view for making it easy to understand the layer constitution of the capacitance type touch panel 100, and it does not accurately show the disposition of each layer.

As shown in FIGS. 1A and 1B, the capacitance type touch panel 100 includes an insulating layer 10; first electrode portions 12, first lead-out wiring portions 14, a first transparent resin layer 16, and a first protective substrate 18 that are disposed on the main surface (on the surface) at one side of the insulating layer 10; second electrode portions 20, second lead-out wiring portions 22, a second transparent resin layer 24, and a second protective substrate 26 that are disposed on the main surface (on the surface) at the other side of the insulating layer 10; a sealing layer 28; and a flexible printed wiring board 30.

Hereinafter, first, embodiments of the sealing layer 28 as one of the characteristics of the present invention will be described in detail, and then other members will be described.

The sealing layer 28 is a layer for preventing salt water from permeating the capacitance type touch panel 100. If the capacitance type touch panel has the sealing layer 28, even after a salt water test, a variation in insulation resistance between the first lead-out wiring portions 14 and between the second lead-out wiring portions 22 is inhibited, and consequentially, operation failure is inhibited. Particularly, as described later, if the sealing layer 28 is disposed on at least the surface of the peripheral edge of the first transparent resin layer 16 that is exposed between the insulating layer 10 and the first protective substrate 18, the surface of the peripheral edge of the second transparent resin layer 24 that is exposed between the insulating layer 10 and the second protective substrate 26, and the exposed surfaces at the other end of the first lead-cut wiring portions 14 and the second lead-out wiring portions 22, it is possible to inhibit salt water from permeating the touch panel from the first transparent resin layer 16 and the second transparent resin layer 24 that relatively easily absorb moisture, and to inhibit salt water from permeating the touch panel from the boundary portion between the first lead-out wiring portion 14 and the first transparent resin layer 16 and from the boundary portion between the second lead-out wiring portion 22 and the second transparent resin layer 24. As a result, intended effects are obtained. Herein, in the laminate of FIG. 1 in which the first electrode portions 12, the first lead-out wiring portions 14, the first transparent resin layer 16, and the first protective substrate 18 are laminated in this order on the main surface at one side of the insulating layer 10; the second electrode portions 20, the second lead-out wiring portions 22, the second transparent resin layer 24, and the second protective substrate 26 are laminated in this order on the main surface at the other side of the insulating layer 10; and the flexible printed wiring board 30 is further laminated, the peripheral edge of the first transparent resin layer 16 and the peripheral edge of the second transparent resin layer 24 mean the lateral surface portion of the first transparent resin layer 16 and the lateral surface portion of the second transparent resin layer 24 that are exposed to the outside.

In FIG. 1, the sealing layer 28 is constituted with a sealing layer 28a that is disposed on the insulating layer 10, the first lead-out wiring portions 14, and the flexible printed wiring board 30; a sealing layer 28b that is disposed on the insulating layer 10, the second lead-out wiring portions 22, and the flexible printed wiring board 30; and a sealing layer 28c that is disposed to cover the end surface of the capacitance type touch panel 100.

The sealing layer 28a and the sealing layer 28b are sealing layers that are disposed near one side of a portion in which the flexible printed wiring board 30 of the long capacitance type touch panel 100 in FIG. 1 is disposed.

The sealing layer 28a is a layer that is disposed on the insulating layer 10, the first lead-out wiring portions 14, and the flexible printed wiring board 30, so as to cover the end surface (lateral surface) of the first transparent resin layer 16 at the other end side (side at which the flexible printed wiring board 30 is present) of the first lead-out wiring portions 14 not covered with the first transparent resin layer 16 and to cover the exposed surface of the first lead-out wiring portions 14 not covered with the first transparent resin layer 16 and the flexible printed wiring board 30.

The sealing layer 28b is a layer that is disposed on the insulating layer 10, the second lead-out wiring portions 22, and the flexible printed wiring board 30, so as to cover the end surface (lateral surface) of the second transparent resin layer 24 of the other end side (side at which the flexible printed wiring board 30 is present) of the second lead-out wiring portions 22 not covered with the second transparent resin layer 24 and to cover the exposed surface of the second lead-out wiring portions 22 not covered with the second transparent resin layer 24 and the flexible printed wiring board 30.

In FIG. 1, the sealing layer 28a and the sealing layer 28b are disposed to cover a portion of the end surfaces of the first protective substrate 18 and the second protective substrate 26, but the present invention is not limited to this embodiment. For example, the sealing layer 28a and the sealing layer 28b may be disposed to cover the entire end surfaces of the first protective substrate 18 and the second protective substrate 26.

At three sides other than one side of the portion in which the flexible printed wiring board 30 of the long capacitance type touch panel 100 in FIG. 1 is disposed, the sealing layer 28c is disposed to cover the end surface (peripheral surface) of the capacitance type touch panel 100. As described later, in FIG. 1, the first electrode portions 12 and the first lead-out wiring portions 14 are covered with the first transparent resin layer 16, except for a portion of the other end side of the first lead-out wiring portions 14, and the second electrode portions 20 and the second lead-out wiring portions 22 are covered with the second transparent resin layer 24, except for a portion of the other end side of the second lead-out wiring portions 22. Accordingly, in FIG. 1, the end surface of the capacitance type touch panel 100 means the end surface formed of the end surface of each of the first transparent resin layer 16, the insulating layer 10, and the second transparent resin layer 24. Herein, in an embodiment in which the end surfaces of the first electrode portions 12 and the first lead-out wiring portions 14 or the end surfaces of the second electrode portions 20 and the second lead-out wiring portions 22 are exposed at the aforementioned three sides, these end surfaces also form the end surface of the capacitance type touch panel 100.

At one side of a portion in which the flexible printed wiring board 30 of the long capacitance type touch panel 100 in FIG. 1 is disposed, the sealing layer 28c is disposed to cover the end surface of the insulating layer 10.

In FIG. 1, the sealing layer 28c is disposed to cover a portion of the end surfaces of the first protective substrate 18 and the second protective substrate 26, but the present invention is not limited to this embodiment. For example, the sealing layer 28c may be disposed to cover the entire end surfaces of the first protective substrate 18 and the second protective substrate 26.

In FIG. 1, the sealing layers 28a, 28b, and 28c are disposed, but the present invention is not limited to this embodiment. For example, when a portion of the first electrode portions 12 is exposed between the insulating layer 10 and the first transparent resin layer 16, and/or when a portion of the second electrode portions 20 is exposed between the insulating layer 10 and the second transparent resin layer 24, the sealing layer 28 is preferably also disposed on the exposed surfaces of the first electrode portions 12 and the second electrode portions 20.

Moreover, in view of further improving visibility and further inhibiting the occurrence of operation failure, the sealing layer is preferably disposed in the peripheral edge of the insulating layer 10, the first transparent resin layer 16, the first protective substrate 18, the second transparent resin layer 24, and the second protective substrate 26 (peripheral edge of the capacitance type touch panel 100) other than main surfaces 18a and 26a that are at the outside of the first protective substrate 18 and the second protective substrate 26 respectively. Furthermore, the sealing layer may be disposed on the entire surface (exposed surface) of the capacitance type touch panel 100.

The moisture vapor transmittance of the sealing layer 28 is equal to or less than 20 g/m$^2$/24 h/atm (25° C., 90% RH, 25 μm). Particularly, in view of further inhibiting the occurrence of operation failure of the touch panel having undergone a salt water test, the moisture vapor transmittance is preferably equal to or less than 10 g/m$^2$/24 h/atm, and more preferably equal to or less than 5 g/m$^2$/24 h/atm. The lower limit thereof is not particularly limited. However, due to the properties of the materials used, the lower limit is generally equal to or greater than 0.1 g/m$^2$/24 h/atm in many cases.

In contrast, when the moisture vapor transmittance of the sealing layer 28 is greater than 20 g/m$^2$/24 h/atm (25° C., 90% RH, 25 μm), resistance of the touch panel to salt water deteriorates, insulation resistance between lead-out wiring portions varies after a salt water test, and operation failure easily occurs.

Herein, the moisture vapor transmittance is measured by a humidity-sensitive sensor method based on JIS K 7129. Moreover, "25° C., 90% RH, 25 μm" are measurement conditions of the moisture vapor transmittance, and mean that the thickness of the sealing layer is 25 μm, and the moisture vapor transmittance is measured in an environment of 25° C. and 90% RH. Furthermore, the unit "g/m$^2$/24 h/atm" of transmittance has the same definition as "g/m$^2$·24 hr·atm".

The thickness of the sealing layer 28 is equal to or greater than 1.0 μm. Particularly, in view of further inhibiting the occurrence of operation failure of the touch panel having undergone a salt water test, the thickness thereof is preferably equal to or greater than 2.0 μm, more preferably equal to or greater than 4.0 μm, and even more preferably equal to or greater than 10.0 μm. The upper limit thereof is not particularly limited. However, because the effect is not further improved, and the economic efficiency is reduced, the upper limit is preferably equal to or less than 50 μm.

In contrast, when the thickness of the sealing layer 28 is less than 1.0 μm, resistance of the touch panel to salt water deteriorates, insulation resistance between lead-out wiring portions varies after a salt water test, and operation failure easily occurs.

Herein, the thickness of the sealing layer 28 is an average thickness obtained by measuring the thicknesses of 20 or more random sites of the sealing layer 28 and calculating an arithmetic mean thereof.

The volume resistivity of the sealing layer 28 is preferably equal to or greater than $10^{11}$ Ωm, more preferably equal to or greater than $10^{12}$ Ωm, and even more preferably equal to or greater than $10^{13}$ Ωcm. If the volume resistivity is within the above range, the occurrence of operation failure is further inhibited. The upper limit thereof is not particularly limited. However, due to the properties of organic compounds used, the upper limit is generally equal to or less than $10^{18}$ Ωcm in many cases.

The material constituting the sealing layer 28 is not particularly limited as long as it is a material that makes the sealing layer 28 exhibit the certain moisture vapor transmittance described above. Examples of the material include silicone-based resins and fluorine-based resins.

Among these, in view of further inhibiting the occurrence of operation failure of the touch panel having undergone a salt water test, fluorine-based resins are preferable. Particularly, fluorine-based resins obtained by copolymerizing (A) a monomer, which has a (per)fluoroalkyl group having 1 to 12 carbon atoms and/or a (per)fluoropolyether group and a carbon-carbon double bond, with (B) a monomer which does not contain fluorine and has a carbon-carbon double bond are more preferable. Herein, the (per)fluoroalkyl group means a fluoroalkyl group or a perfluoroalkyl group, and the (per)fluoropolyether group means a fluoropolyether group or a perfluoropolyether group.

As Component (A), a (meth)acrylate-based monomer and a vinyl-based monomer are preferable. Examples of the (meth)acrylate-based monomer include trifluoroethyl(meth)acrylate, perfluorodecyl ethyl(meth)acrylate, perfluorooctyl ethyl(meth)acrylate, perfluorohexyl ethyl(meth)acrylate, perfluorobutyl ethyl(meth)acrylate, perfluoropolyether (meth)acrylate, and the like. Examples of the vinyl-based monomer include trifluoromethyl vinyl, perfluoroethyl vinyl, perfluoroethyl ether vinyl, and the like. Herein, "(meth)acrylate" means acrylate or methacrylate.

The functional group in Component (A) is preferably a perfluoroalkyl group or a perfluoropolyether group. The use of these functional groups further improves the solubility of the resin in a solvent which will be described later.

One kind of Component (A) can be used singly, or two or more kinds thereof can be used by being mixed with each other. The content thereof is preferably within a range of 50% by mass to 95% by mass, based on the fluorine-based resin obtained by copolymerizing Component (A) and Component (B). If the content of Component (A) is less than 50% by mass, solubility of the resin in a solvent is reduced. If the content exceeds 95% by mass, the sealing layer 28 becomes brittle, and accordingly, the sealing layer 28 easily cracks by a sudden change in temperature or the like, and it is difficult to maintain moisture proof properties, insulating properties, or acid resistance in some cases. From the viewpoints described above, the content of Component (A) is more preferably within a range of 60% by mass to 85% by mass.

The monomer as Component (B) which does not contain fluorine and has a carbon-carbon double bond is preferably a (meth)acrylate-based monomer, a styrene-based monomer, an olefin-based monomer, or a vinyl-based monomer.

Examples of the (meth)acrylate-based monomer include methyl(meth)acrylate, 2-ethylhexyl(meth)acrylate, isobornyl(meth)acrylate, glycidyl(meth)acrylate, benzyl(meth)acrylate, stearyl(meth)acrylate, lauryl(meth)acrylate, 2-hydroxy-3-phenoxypropyl(meth)acrylate, and the like. Examples of the styrene-based monomer include styrene and the like. Examples of the olefin-based monomer include ethylene, propylene, and the like. Examples of the vinyl-based monomer include vinyl chloride, vinylidene chloride, and the like.

One kind of Component (B) can be used singly, or two or more kinds thereof may be used by being mixed with each other. The content of Component (B) is preferably within a range of 5% by mass to 50% by mass, based on the fluorine-based resin obtained by copolymerizing Component (A) with Component (B). If the content of Component (B) is less than 5% by mass, the sealing layer 28 becomes brittle, and if the content exceeds 50% by mass, solubility of the resin in a solvent is reduced in some cases. From the viewpoints described above, the content of Component (B) is more preferably within a range of 10% by mass to 40% by mass.

The fluorine-based resin is preferably obtained by polymerizing Component (A) with Component (B). The polymerization method is not particularly limited, and the methods known in the prior art can be used. The weight average molecular weight of the fluorine-based resin is preferably within a range of 50,000 to 800,000. Component (A) and Component (B) may be copolymerized in the form of a random copolymer or a block copolymer.

As described later, for forming the sealing layer 28, it is preferable to use a coating agent containing the fluorine-based resin (a composition for forming a sealing layer).

The content of the fluorine-based resin in the coating agent is preferably within a range of 8% by mass to 60% by mass. If the content is equal to or greater than 8% by mass, the film thickness is increased, and accordingly, high moisture proof properties are obtained. In contrast, if the content is equal to or less than 60% by mass, appropriate viscosity is obtained, and accordingly, coating properties and drying properties become excellent. From the viewpoints described above, the content of the fluorine-based resin in the coating agent is more preferably within a range of 10% by mass to 50% by mass.

The coating agent preferably contains a non-flammable fluorine-based solvent in addition to the fluorine-based resin. The non-flammable fluorine-based solvent refers to a substance that has fluorine in the structure thereof and thus does not form a flash point. The substance preferably stays in liquid form at room temperature, and from the viewpoint of drying properties after coating of the coating agent, the boiling point thereof is preferably equal to or higher than 55° C. If the boiling point is equal to or higher than 55° C., the drying rate does not become too high, and a smooth and uniform film can be obtained. The upper limit of the boiling point is not particularly limited. However, from the viewpoint of obtaining a film with higher productivity, the upper limit is preferably equal to or less than 180° C.

The non-inflammable fluorine-based solvent is not particularly limited as long as it has the aforementioned physical properties, and examples thereof include hydrofluoroether, perfluoropolyether, perfluoroalkane, hydrofluoropolyether, hydrofluorocarbon, and the like. One kind of these non-inflammable fluorine-based solvent can be used singly, or two or more kinds thereof can be used by being mixed with each other.

The content of the non-inflammable fluorine-based solvent in the coating agent is preferably within a range of 20% by mass to 92% by mass. If the content is equal to or greater than 20% by mass, non-flammable properties are secured, hence safety becomes excellent. In contrast, if the content is equal to or less than 92% by mass, the proportion of the resin component relatively increases, hence the film thickness increases. From the viewpoints described above, the content of the non-inflammable fluorine-based solvent in the coating agent is more preferably within a range of 40% by mass to 90% by mass.

Furthermore, in addition to the non-inflammable fluorine-based solvent, other solvents can be added to the coating agent, within a range in which the coating agent does not exhibit flammability as a whole. For example, fluorine-based solvents or alcohols having flammability such as trifluoropropanol, m-xylene hexafluoride, and the like, and organic solvents such as a paraffin-based solvent, an ester-based solvent, and the like can be mixed with the coating agent.

The content of fluorine atoms in the sealing layer 28 is preferably equal to or greater than 1% by mass, more preferably equal to or greater than 3% by mass, and even more preferably equal to or greater than 5% by mass, with respect to the total amount of the sealing layer. If the content is within the above range, the occurrence of operation failure is further inhibited. The upper limit of the content is not particularly limited. However, due to the properties of organic compounds used, the upper limit is generally equal to or less than 76% by mass in many cases.

The insulating layer 10 is a layer for securing insulating properties between the first electrode portion 12 and the second electrode portion 20. In FIG. 1, the insulating layer 10 is a single layer, but the insulating layer 10 may be composed of a plurality of layers including two or more layers.

The thickness of the insulating layer 10 (when there is a plurality of insulating layers including two or more layers, which is the total thickness thereof) is not particularly limited. However, the thickness is preferably 5 μm to 350 μm, and more preferably 30 μm to 150 μm. If the thickness is within the above range, the intended visible light transmittance is obtained, and it is easy to handle the insulating layer.

The total light transmittance of the insulating layer 10 is preferably 85% to 100%.

The insulating layer 10 is preferably a transparent insulating layer, and specific examples thereof include an insulating resin layer, a ceramic layer, a glass layer, and the like. Among these, an insulating resin layer is preferable since it is excellent in toughness.

More specifically, examples of the material constituting the insulating resin layer include polyethylene terephthalate, polyether sulfone, polyacrylic resins, polyurethane-based resins, polyester, polycarbonate, polysulfone, polyamide, polyarylate, polyolefin, cellulose-based resins, polyvinyl chloride, cycroolefin-based resins, and the like. Among these, polyethylene terephthalate, cycroolefin-based resins, polycarbonate, and triacetylcellulose resin are preferable since they are excellent in transparency.

The first electrode portions 12 and the second electrode portions 20 are sensing electrodes that sense a change in capacitance in the capacitance type touch panel 100, and constitute a sensor portion. That is, when a fingertip is brought into contact with the touch panel, mutual capacitance between the first electrode portion 12 and the second electrode portion 20 changes, and based on the amount of change, the position of the fingertip is calculated by an IC circuit.

The first electrode portions 12 are electrodes that extend in a first direction (X-direction) and are arranged in a second direction (Y-direction) orthogonal to the first direction. These electrodes have a predetermined pattern. The second electrode portions 20 are electrodes that extend in the second direction (Y-direction) and are arranged in the first direction (X-direction). These electrodes have a predetermined pattern. In FIG. 1, there are five first electrode portions 12 and four second electrode portions 20. However, the number thereof is not particularly limited as long as it is a plural number.

Figure 2:
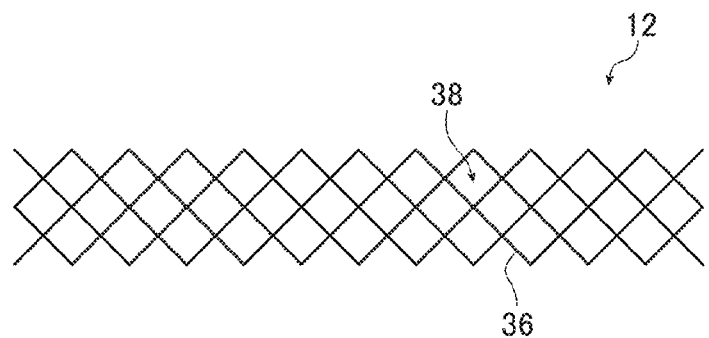
FIG. 2 is an enlarged plan view of a first electrode portion.

In FIG. 1, the first electrode portions 12 and the second electrode portions 20 are constituted with thin conductive wires. FIG. 2 is an enlarged plan view of one first electrode portion 12. As shown in FIG. 2, each of the first electrode portions 12 is constituted with thin conductive wires 36 and has a plurality of lattices 38 formed by the thin conducive wires 36 crossing each other. Similarly to each of the first electrode portions 12, each of the second electrode portions 20 also has a plurality of lattices 38 formed by the thin conductive wires 36 crossing each other.

In FIG. 1, all of the first electrode portions 12 and the second electrode portions 20 are long electrodes. However, the shape thereof is not limited to the embodiment, and the electrodes may have a so-called diamond pattern in which rhombuses continue in series.

Examples of the material of the thin conductive wires 36 include metals such as gold (Au), silver (Ag), copper (Cu), and aluminum (Al), alloys of these, metal oxides such as ITO, tin oxide, zinc oxide, cadmium oxide, gallium oxide, and titanium oxide, and the like. Among these, silver is preferable since conductivity of the thin conductive wires 36 becomes excellent.

From the viewpoint of the adhesiveness between the thin conductive wire 36 and the insulating layer 10, the thin conductive wires 36 preferably contain a binder.

The binder is preferably a water-soluble polymer since the adhesiveness between the thin conductive wire 36 and the insulating layer 10 is further improved. Examples of the types of the binder include polysaccharides such as gelatin, carrageenan, polyvinyl alcohol (PVA), polyvinylpyrrolidone (PVP), and starch, cellulose and derivatives thereof, polyethylene oxide, polysaccharide, polyvinyl amine, chitosan, polylysine, polyacrylic acid, polyalginic acid, polyhyaluronic acid, carboxycellulose, gum Arabic, sodium alginate, and the like. Among these, gelatin is preferable since the adhesiveness between the thin conductive wire 36 and the insulating layer 10 is further improved.

Herein, as gelatin, in addition to lime-treated gelatin, acid-treated gelatin may be used. Moreover, it is possible to use a hydrolysate of gelatin, an enzymatic decomposition product of gelatin, and gelatin modified with an amino group or a carboxyl group (phthalated gelatin or acetylated gelatin).

The volume ratio between a metal and a binder (volume of metal/volume of binder) in the thin conductive wires 36 is preferably equal to or higher than 1.0, and more preferably equal to or higher than 1.5. If the volume ratio between a metal and a binder is equal to or higher than 1.0, the conductivity of the thin conductive wires 36 can be further improved. The upper limit of the volume ratio is not particularly limited. However, from the viewpoint of productivity, the upper limit is preferably equal to or less than 4.0, and more preferably equal to or less than 2.5.

In the present invention, the volume ratio between a metal and a binder can be calculated from the density of the metal and the binder contained in the thin conductive wires 36. For example, when the metal is silver and the binder is gelatin, the volume ratio is calculated under the conditions of the density of silver at 10.5 g/cm$^3$ and the density of gelatin at 1.34 g/cm$^3$.

The line width of the thin conductive wires 36 is not particularly limited. However, from the viewpoint of making it possible to relatively easily form electrodes having low resistance, the line width is preferably equal to or less than 30 μm, more preferably equal to or less than 15 μm, even more preferably equal to or less than 10 μm, particularly preferably equal to or less than 9 μm, and most preferably equal to or less than 7 μm. The line width is preferably equal to or greater than 0.5 μm, and more preferably equal to or greater than 1.0 μm.

The thickness of the thin conductive wires 36 is not particularly limited. However, from the viewpoint of conductivity and visibility, the thickness can be selected within a range of 0.00001 mm to 0.2 mm. The thickness is preferably equal to or less than 30 μm, more preferably equal to or less than 20 μm, even more preferably 0.01 μm to 9 μm, and most preferably 0.05 μm to 5 μm.

Each of the lattices 38 includes an opening region surrounded by the thin conductive wires 36. A length W of one side of each of the lattices 38 is preferably equal to or less than 800 μm, more preferably equal to or less than 600 μm, and even more preferably equal to or less than 400 μm.

In view of visible light transmittance, the opening ratio in the first electrode portions 12 and the second electrode portions 20 is preferably equal to or higher than 85%, more preferably equal to or higher than 90%, and most preferably equal to or higher than 95%. The opening ratio corresponds to a proportion of a transmitting portion, excluding the thin conductive wires 36 of the first electrode portions 12 or the second electrode portions 20 in a predetermined region, in the entire region.

The lattices 38 have the shape of approximate to a rhombus. However, the lattices 38 may also have the shape of a polygon (for example, a triangle, a quadrangle, or a hexagon). Moreover, one side of each of the lattices may be in the form of a curved line or an arc in addition to the form of a straight line. When one side of each of the lattices is in the form of an arc, for example, two sides facing each other may be in the form of arcs curving toward the outside, and the other two sides facing each other may be in the form of arcs curving toward the inside. Furthermore, each side of the lattices may be in the form of a wavy line in which an arc curving toward the outside and an arc curving toward the inside continue. Needless to say, each side of the lattices may form a sine curve.

In FIG. 2, the thin conductive wires 36 form a mesh pattern. However, the present invention is not limited to the embodiment, and the wires may form a stripe pattern.

In FIG. 1, the first electrode portions 12 and the second electrode portions 20 are constituted with the thin conductive wires 36. However, the present invention is not limited to the embodiment, and for example, the electrode portions may be formed of a thin metal oxide film (transparent thin metal oxide film) such as ITO or ZnO or formed of a transparent conductive film in which a network is constituted with metal nanowires such as silver nanowires or copper nanowires. Moreover, the electrode portions may be manufactured by using metal oxide particles or metal paste such as silver paste or copper paste. Among these, in view of excellent conductivity and transparency, silver nanowires are preferable.

In addition, the patterning method of the electrode portions can be selected according to the material of the electrode portions, and a photolithography method, a resist mask screen printing-etching method, an ink jet method, a printing method, and the like may be used.

The first lead-out wiring portions 14 are wirings for connecting the first electrode portions 12 to the flexible printed wiring board 30 which will be described later. The first lead-out wiring portions 14 are disposed at the peripheral edge of the first electrode portions 12. One end of each of the first lead-out wiring portions 14 is connected to the corresponding first electrode portion 12, and the other end thereof is electrically connected to a terminal (not shown in the drawing) in the flexible printed wiring board 30. That is, the other end of the first lead-out wiring portions 14 extends to the outside of the first transparent resin layer 16 which will be described later, and on the portion in which the other end extends, the sealing layer 28 is disposed.

The second lead-out wiring portions 22 are wirings for connecting the second electrode portions 20 to the flexible printed wiring board 30 which will be described later. The second lead-out wiring portions 22 are disposed at the peripheral edge of the second electrode portions 20. One end of each of the second lead-out wiring portions 22 is connected to the corresponding second electrode portion 20, and the other end thereof is electrically connected to a terminal (not shown in the drawing) in the flexible printed wiring board 30. That is, the other end of the second lead-out wiring portions 22 extends to the outside of the second transparent resin layer 24 which will be described later, and on the portion in which the other end extends, the sealing layer 28 is disposed.

As shown in FIG. 1, the respective other ends of the first lead-out wiring portions 14 and the second lead-out wiring portions 22 collectively constitute the other end portions connected to the flexible printed wiring board 30. In FIG. 1, there are five first lead-out wiring portions 14 and four second lead-out wiring portions 22. However, the number thereof is not particularly limited, and generally, a plurality of wiring portions is disposed corresponding to the number of the electrode portions.

Examples of the material of wirings constituting the first lead-out wiring portions 14 and the second lead-out wiring portions 22 include metals such as gold (Au), silver (Ag), and copper (Cu), metal oxides such as tin oxide, zinc oxide, cadmium oxide, gallium oxide, and titanium oxide, and the like. Among these, silver is preferable since it is excellent in conductivity. Furthermore, the wiring portions may be constituted with metal paste such as silver paste or copper paste, or a thin film of a metal such as aluminum (Al) or molybdenum (Mo), or an alloy. In the case of the metal paste, a screen printing method or an ink jet printing method is preferably used. In the case of the thin film of a metal or an alloy, a sputtered film is preferably patterned by a photolithography method or the like.

As the material of wirings constituting the thin conductive wires 36, the first lead-out wiring portions 14, and the second lead-out wiring portions 22, metal nanowires may be used, since the value of surface resistance thereof is lower than that of a metal oxide such as ITO, and a transparent conductive layer is easily formed. As the metal nanowires, fine metal particles are preferable which have an aspect ratio (average wire length/average wire diameter) equal to or higher than 30, an average wire diameter equal to or greater than 1 nm and equal to or less than 150 nm, and an average wire length equal to or greater than 1 μm and equal to or less than 100 μm. The average wire diameter of the metal nanowires is preferably equal to or less than 100 nm, more preferably equal to or less than 30 nm, and even more preferably equal to or less than 25 nm. The average wire length of the metal nanowires is preferably equal to or greater than 1 μm and equal to or less than 40 μm, more preferably equal to or greater than 3 μm and equal to or less than 35 μm, and even more preferably equal to or greater than 5 μm and equal to or less than 30 μm.

The metal constituting the metal nanowires is not particularly limited. As the metal, one kind of metal may be used singly, or two or more kinds of metals may be used in combination. Alternatively, an alloy can be used. Specific examples of the metal include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, an alloy of these, and the like. It is preferable to use silver nanowires in which the content of silver is equal to or greater than 50% in terms of mass ratio.

The metal nanowires may be prepared by any method. The manufacturing methods of the metal nanowires are described in detail in, for example, Adv. Mater. Vol. 14, 2002, 833-837, JP 2010-084173 A, and US 2011/0174190 A. Examples of the documents relating to the metal nanowires include JP 2010-86714 A, JP 2010-87105 A, JP 2010-250109 A, JP 2010-250110 A, JP 2010-251611 A, JP 2011-54419 A, JP 2011-60686 A, JP 2011-65765 A, JP 2011-70792 A, JP 2011-86482 A, and JP 2011-96813 A. In the present invention, the contents disclosed in these documents can be used in combination as appropriate.

The first transparent resin layer 16 and the second transparent resin layer 24 are disposed on the first electrode portions 12 and the second electrode portions 20 respectively. They are layers (particularly, adhesive transparent resin layers) for securing the adhesiveness between the first electrode portions 12 and the first protective substrate 18 and the adhesiveness between the second electrode portions 20 and the second protective substrate 26. In FIG. 1, the first transparent resin layer 16 covers the first lead-out wiring portions 14 and the first electrode portions 12, such that the other end of the first lead-out wiring portions 14 connected to the flexible printed wiring board 30 is exposed. The second transparent resin layer 24 covers the second lead-out wiring portions 22 and the second electrode portions 20, such that the other end of the second lead-out wiring portions 22 connected to the flexible printed wiring board 30 is exposed. As shown in FIG. 1, the size of the first transparent resin layer 16 and the second transparent resin layer 24 is generally smaller than the size of the insulating layer 10, such that the other end of the first lead-out wiring portions 14 and the other end of the second lead-out wiring portions 22 are exposed.

The thickness of the first transparent resin layer 16 and the second transparent resin layer 24 is not particularly limited. However, the thickness is preferably 5 μm to 350 μm, and more preferably 30 μm to 150 μm. If the thickness is within the above range, an intended visible light transmittance is obtained, and it is easy to handle the layers.

The total light transmittance of the first transparent resin layer 16 and the second transparent resin layer 24 is preferably 85% to 100%.

As the material constituting the first transparent resin layer 16 and the second transparent resin layer 24, known adhesives can be used. Examples of the material include rubber-based adhesive insulating materials, acrylic adhesive insulating materials, silicone-based adhesive insulating materials, and the like. Among these, from the viewpoint of excellent transparency, acrylic adhesive insulating materials are preferable.

The acrylic adhesive insulating materials as a preferable embodiment of the adhesive insulating materials are materials that contain, as a main component, an acrylic polymer having a repeating unit derived from alkyl(meth)acrylate. Herein, "(meth)acrylate" refers to either or both of acrylate and methacrylate. Among the acrylic adhesive insulating materials, in view of superior adhesiveness, acrylic polymers having a repeating unit derived from alkyl(meth) acrylate containing an alkyl group having about 1 to 12 carbon atoms are preferable, and acrylic polymers having a repeating unit derived from alkyl methacrylate having about 1 to 12 carbon atoms and a repeating unit derived from alkyl acrylate having about 1 to 12 carbon atoms are more preferable.

The repeating units of the acrylic polymer may include a repeating unit derived from (meth)acrylic acid.

The first protective substrate 18 and the second protective substrate 26 are disposed on the first transparent resin layer 16 and the second transparent resin layer 24 respectively. They are substrates for protecting the first electrode portions 12 or the second electrode portions 20 from the external environment. Generally, the main surface of one of the protective substrates constitutes a touch screen.

As the first protective substrate 18 and the second protective substrate 26, a transparent substrate is preferable, and a plastic film, a plastic plate, a glass plate, and the like are used. The thickness of the layer is desirably set as appropriate according to the purpose thereof.

As the raw material of the plastic film and the plastic plate, for example, it is possible to use polyesters such as polyethylene terephthalate (PET) and polyethylene naphthalate (PEN); polyolefins such as polyethylene (PE), polypropylene (PP), polystyrene, and EVA; vinyl-based resins; and others such as polycarbonate (PC), polyamide, polyimide, acrylic resins, triacetyl cellulose (TAC), cycloolefin-based resins (COP), and the like.

Furthermore, as the first protective substrate 18 and the second protective substrate 26, a liquid crystal display, a polarizing plate, a circularly polarizing plate, and the like may be used.

The flexible printed wiring board 30 is a plate in which a plurality of wirings and terminals is provided on a substrate. The flexible printed wiring board 30 is connected to the other end of each of the first lead-out wiring portions 14 and to the other end of each of the second lead-out wiring portions 22, and plays a role of connecting the capacitance type touch panel 100 to an external apparatus (for example, a liquid crystal display apparatus). As shown in FIG. 1, the flexible printed wiring board 30 is disposed in a state of clamping the first lead-out wiring portions 14, the insulating layer 10, and the second lead-out wiring portions 22.

When the capacitance type touch panel 100 is subjected to a salt water spray test of JIS Z 2371 and left as is for 24 hours, and then a DC resistance thereof is measured, the DC resistance between the first lead-out wiring portions 14 adjacent to each other and between the second lead-out wiring portions 22 adjacent to each other is equal to or greater than 300 k$\Omega$. The DC resistance is preferably equal to or greater than 500 k$\Omega$, and more preferably equal to or greater than 1 M$\Omega$. If the DC resistance is within the above range, the yield of the capacitance type touch panel is improved.

FIG. 1 shows an embodiment of providing a sealing layer in a capacitance type touch panel in which electrode portions are disposed on both surfaces of an insulating layer. However, as described later, the present invention is not limited to the embodiment. For example, there may be an embodiment of a capacitance type touch panel having a sealing layer that is obtained in a manner in which a pair of electrode portions-equipped insulating layers composed of an insulating layer and electrode portions disposed on the surface of the insulating layer are prepared; the insulating layers are stuck on each other via a transparent resin layer, such that the electrode portions face each other, or the insulating layer of one of the electrode portions-equipped insulating layers face the electrode portions of the other electrode-portions equipped insulating layer. Moreover, for example, there may be an embodiment of a capacitance type touch panel having a sealing layer that is obtained by providing first electrode portions and second electrode portions on the main surface at one side of an insulating layer.

The manufacturing method of the capacitance type touch panel 100 is not particularly limited, and known methods can be adopted.

As a method for forming the first electrode portions 12 and the first lead-out wiring portions 14 on one main surface of the insulating layer 10, and forming the second electrode portions 20 and the second lead-out wiring portions 22 on the other main surface of the insulating layer 10, for example, there is a method in which a resist pattern is formed by performing an exposure and development treatment on a photoresist film on a metal foil formed on both the main surfaces of the insulating layer 10; and the metal foil exposed through the resist pattern is etched.

Moreover, for example, there is a method in which paste containing fine metal particles or metal nanowires is printed on both the main surfaces of the insulating layer 10; and the paste is plated with a metal.

Furthermore, for example, there is a method in which the aforementioned electrode portions and wiring portions are formed on the insulating layer 10 by printing using a screen printing plate or a gravure printing plate, or a method in which those portions are formed by an ink jet.

In addition to the aforementioned methods, for example, there is a method of using silver halide. More specifically, for example, there is a method including Step (1) of forming a silver halide emulsion layer (hereinafter, simply referred to as a "photosensitive layer" in some cases) containing silver halide and a binder on both surfaces of the insulating layer 10 and Step (2) of exposing the photosensitive layer to light and then performing a development treatment on the photosensitive layer so as to form the first electrode portions 12 and the first lead-out wiring portions 14 as well as the second electrode portions 20 and the second lead-out wiring portions 22.

Hereinafter, each of the steps will be described.

[Step (1): Step of Forming Photosensitive Layer]

Step (1) is a step of forming a photosensitive layer containing silver halide and a binder on both surfaces of an insulating layer 10.

The method for forming the photosensitive layer is not particularly limited. However, in view of productivity, a method is preferable in which a composition for forming a photosensitive layer containing silver halide and a binder is brought into contact with an insulating layer 10 such that a photosensitive layer is formed on both surfaces of the insulating layer 10.

Hereinafter, embodiments of the composition for forming a photosensitive layer used in the aforementioned method will be described in detail, and then the procedure of the step will be described in detail.

The composition for forming a photosensitive layer contains silver halide and a binder.

The halogen element contained in the silver halide may be any of chlorine, bromine, iodine, and fluorine, and these may be used in combination. As the silver halide, for example, silver halide containing silver chloride, silver bromide, or silver iodide as a main component is preferably used, and silver halide containing silver bromide or silver chloride as a main component is more preferably used.

The types of the binder used are as described above. The binder may be contained in the composition for forming a photosensitive layer, in the form of latex.

The volume ratio between the silver halide and the binder contained in the composition for forming a photosensitive layer is not particularly limited, and is appropriately adjusted so as to fall within the aforementioned preferable range of the volume ratio between the metal and the binder in the thin conductive wires 36.

If necessary, the composition for forming a photosensitive layer contains a solvent.

Examples of the solvent used include water, organic solvents (for example, alcohols such as methanol, ketones such as acetone, amides such as formamide, sulfoxides such as dimethyl sulfoxide, esters such as ethyl acetate, and ethers), ionic liquids, and mixed solvents composed of these.

The content of the solvent used is not particularly limited. However, it is preferably-within a range of 30% by mass to 90% by mass, and more preferably within a range of 50% by mass to 80% by mass, with respect to the total mass of the silver halide and the binder.

(Procedure of Step)

The method of bringing the composition for forming a photosensitive layer into contact with the insulating layer 10 is not particularly limited, and a known method can be adopted. Examples of the method include a method of coating the insulating layer 10 with the composition for forming a photosensitive layer, a method of dipping the insulating layer 10 into the composition for forming a photosensitive layer, and the like.

The content of the binder in the formed photosensitive layer is not particularly limited, and is preferably 0.3 g/m$^2$ to 5.0 g/m$^2$, and more preferably 0.5 g/m$^2$ to 2.0 g/m$^2$.

The content of the silver halide in the Photosensitive layer is not particularly limited. However, because the conductivity of the thin conductive wires 36 is further improved, the content thereof is preferably 1.0 g/m$^2$ to 20.0 g/m$^2$, and more preferably 5.0 g/m$^2$ to 15.0 g/m$^2$ expressed in terms of silver.

If necessary, a protective layer composed of the binder may be further provided on the photosensitive layer. If the protective layer is provided, scratches are prevented, or dynamic characteristics are improved.

[Step (2): Step of Exposure and Development]

Step (2) is a step of pattern-wisely exposing the photosensitive layer obtained in the step (1) to light and performing a development treatment on the photosensitive layer so as to form the first electrode portions 12 and the first lead-out wiring portions 14 as well as the second electrode portions 20 and the second lead-out wiring portions 22.

Hereinafter, first, the pattern exposure treatment will be described in detail, and then the development treatment will be described in detail.

(Pattern Exposure)

When the photosensitive layer is pattern-wisely exposed to light, the silver halide in the photosensitive layer in the exposed region forms a latent image. In the region in which the latent image is formed, thin conductive wires are formed by the development treatment which will be described later. In contrast, in the unexposed region that is not exposed to light, the silver halide is dissolved and flows out of the photosensitive layer at the time of the fixing treatment, which will be described later, and thus a transparent film is obtained.

The light source used for exposure is not particularly limited, and examples thereof include light such as visible rays and ultraviolet rays, radiation such as X-rays, and the like.

The method for performing the pattern exposure is not particularly limited. For example, the pattern exposure may be performed by either surface exposure using a photomask or scanning exposure using laser beams. Herein, the form of the pattern is not particularly limited and appropriately adjusted according to the intended pattern of the thin conductive wires to be formed.

(Development Treatment)

The method of development treatment is not particularly limited, and known methods can be adopted. For example, it is possible to use general technologies of the development treatment used for silver halide photographic films, photographic printing paper, films for making printing plate, emulsion masks for photomask, and the like.

The type of the developer used for the development treatment is not particularly limited, and for example, it is possible to use a PQ developer, an MQ developer, an MAA developer, and the like. As commercially available products, for example, it is possible to use developers such as CN-16, CR-56, CP45X, FD-3, and Papitol formulated by FUJIFILM Corporation, C-41, E-6, RA-4, D-19, and D-72 formulated by KODAK, and developers included in the kit thereof. Furthermore, it is possible to use a lithographic developer.

The development treatment can include a fixing treatment performed for stabilization by removing silver halide in an unexposed portion. For the fixing treatment, it is possible to use technologies of the fixing treatment used for silver halide photographic films, photographic printing paper, films for making printing plates, emulsion masks for photomask, and the like.

In the fixing treatment, the fixing temperature is preferably about 20° C. to about 50° C., and more preferably 25° C. to 45° C. The fixing time is preferably 5 seconds to 1 minute, and more preferably 7 seconds to 50 seconds.

The mass of metal silver contained in the exposed portion (thin conductive wire) having undergone the development treatment is preferably equal to or greater than 50% by mass, and more preferably equal to or greater than 80% by mass, with respect to the mass of silver contained in the exposed portion having not yet been exposed to light. If the mass of silver contained in the exposed portion is equal to or greater than 50% by mass with respect to the mass of silver contained in the exposed portion having not yet been exposed to light, it is preferable since a high degree of conductivity can be obtained.

If necessary, in addition to the aforementioned steps, the following step of forming an undercoat layer, step of forming an anti-halation layer, or heating treatment may be performed.

(Step of Forming Undercoat Layer)

Because the adhesiveness between the insulating layer and the silver halide emulsion layer becomes excellent, it is preferable to perform a step of forming a binder-containing undercoat layer on both surfaces of the insulating layer before step (1).

The binder used in this step is as described above. The thickness of the undercoat layer is not particularly limited. However, because the adhesiveness is further improved, and the rate of change in mutual capacitance is further reduced, the thickness thereof is preferably 0.01 µm to 0.5 µm, and more preferably 0.01 µm to 0.1 µm.

(Step of Forming Anti-Halation Layer)

From the viewpoint of making thinner conductive wires, it is preferable to perform a step of forming an anti-halation layer on both surfaces of the insulating layer before step (1).

Regarding the material used for the anti-halation layer, description of paragraphs [0029] to [0032] of JP 2009-188360 A can be referred to.

Because the rate of change in mutual capacitance is further reduced, and the migration resistance between electrode portions becomes excellent, the anti-halation layer preferably contains a crosslinking agent. As the crosslinking agent, any of organic film hardening agents and inorganic film hardening agents can be used. However, from the viewpoint of controlling film curing, organic film hardening agents are preferable, and specific examples thereof include aldehydes, ketones, carboxylic acid derivatives, sulfonic acid esters, triazines, active olefins, isocyanate, and carbodiimide.

(Step (3): Step of Heating)

Step (3) is a step of performing a heating treatment after the development treatment. By performing this step, the binders are fused with each other, and the hardness of the thin conductive wires is further increased. Particularly, when polymer particles are dispersed as the binder in the composition for forming a photosensitive layer (when the binder is a polymer particle in latex), by performing this step, the polymer particles are fused with each other, and thin conductive wires exhibiting an intended hardness are formed.

The conditions of the heating treatment are appropriately set according to the binder used. However, from the viewpoint of the film formation temperature of the polymer particles, the heating treatment is preferably performed at a temperature equal to or higher than 40° C., more preferably performed at a temperature equal to or higher than 50° C., and even more preferably performed at a temperature equal to or higher than 60° C. Furthermore, from the viewpoint of inhibiting curling or the like of the insulating layer, the heating treatment is preferably performed at a temperature equal to or less than 150° C., and more preferably performed at a temperature equal to or less than 100° C.

The heating time is not particularly limited. However, from the viewpoint of inhibiting curling or the like of the insulating layer and the viewpoint of productivity, the heating time is preferably 1 minute to 5 minutes, and more preferably 1 minute to 3 minutes.

Generally, the heating treatment can also function as a step of drying that is performed after the exposure and development treatment. Therefore, a new step does not need to be additionally performed for forming a film of polymer particles, and as a result, it is excellent in view of productivity, cost, and the like.

By performing the aforementioned step, a binder-containing light transmitting portion is formed between the thin conductive wires. The transmittance in the light transmitting portion that is expressed as the minimum transmittance in a region of a wavelength of 380 nm to 780 nm is preferably equal to or higher than 90%, more preferably equal to or higher than 95%, even more preferably equal to or higher than 97%, particularly preferably equal to or higher than 98%, and most preferably equal to or higher than 99%.

The light transmitting portion may contain materials other than the binder, and examples thereof include a poor solvent for silver and the like.

If the poor solvent for silver is contained in the light transmitting portion, ion migration of a metal caused between the thin conductive wires can be further inhibited. pKsp of the poor solvent for silver is preferably equal to or greater than 9, and more preferably 10 to 20. The poor solvent for silver is not particularly limited, and examples thereof include triethylenetetramine hexaacetic acid (TTHA) and the like.

The solubility product Ksp of silver is an index of the intensity of interaction among those compounds and silver ions. The Ksp can be measured with reference to the methods described in "Yoshikata Sakaguchi and Shinichi Kikuchi, Journal of The Society of Photography and Imaging of Japan, 13, 126, (1951)" and "A. Pailliofet and J. Pouradier, Bull. Soc. Chim. France, 1982, I-445 (1982)".

The method for forming the first transparent resin layer 16 and the second transparent resin layer 24 is not particularly limited. Examples of the method include a method of sticking known transparent resin films on each other, a method of forming a layer by coating of a composition for forming a transparent resin layer that forms a transparent resin layer, and the like.

In forming the first transparent resin layer 16 and the second transparent resin layer 24, each of the layers is formed such that the other end of the first lead-out wiring portions 14 that is opposite to one end thereof joined to the first electrode portions 12 and the other end of the second lead-out wiring portions 22 that is opposite to one end thereof joined to the second electrode portions 20 are exposed.

The method for forming the first protective substrate 18 and the second protective substrate 26 is not particularly limited, and examples of the method include a method of sticking a protective layer on the first transparent resin layer 16 and the second transparent resin layer 24.

After the protective substrates are formed, terminals (not shown in the drawing) of the flexible printed wiring board 30 are connected to the other ends of the exposed first lead-cut wiring portions 14 and the second lead-out wiring portions 22. In this manner, the flexible printed wiring board 30 is disposed, and a laminate is obtained.

The method for forming the sealing layer 28 is not particularly limited, and examples of the method include a method of coating a composition for forming a sealing layer (for example, a coating agent containing the aforementioned fluorine-based resin) that forms the sealing layer 28 to a predetermined position. More specifically, examples of the method include a method of dipping the aforementioned laminate in the composition, a method of spray-coating the composition to a predetermined position of the laminate, and the like.

For example, for disposing a sealing layer on the entire surface excluding the main surfaces 18a and 26a of the first protective substrate 18 and second protective substrate 26, a removable protective film is disposed on the main surfaces 18a and 26a of the first protective substrate 18 and the second protective substrate 26 of the laminate obtained as above; the obtained laminate is brought into contact with the composition for forming a sealing layer (preferably, dipped in the composition for forming a sealing layer); and then the protective film is removed, whereby an intended capacitance type touch panel can be manufactured.

Herein, having a high degree of drying properties, the aforementioned coating agent can be easily dried by being left at room temperature and can form a film in this way. However, if necessary, the coating agent may be dried by heating.

The surface tension of the composition for forming a sealing layer is preferably equal to or less than 20 mN/m, and more preferably equal to or less than 15 mN/m. Moreover, the viscosity of the composition for forming a sealing layer is preferably equal to or less than 100 cps, and more preferably equal to or less than 50 cps. If the surface tension and viscosity are within the above range, the occurrence of operation failure is further inhibited.

Second Embodiment

Figure 3:
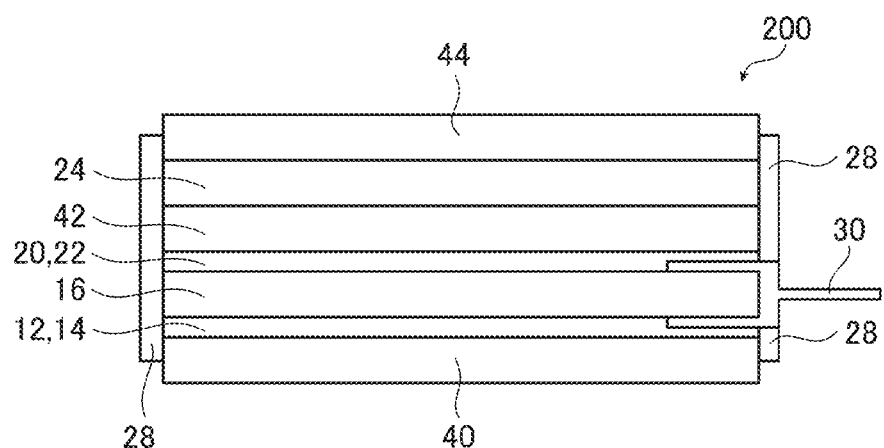
FIG. 3 is a cross-sectional view of a second embodiment of the capacitance type touch panel of the present invention.

FIG. 3 is a cross-sectional view of a second embodiment of the capacitance type touch panel of the present invention.

Herein, FIG. 3 is merely a schematic view for making it easy to understand the layer constitution of a capacitance type touch panel 200, and it does not accurately show the disposition of each layer.

As shown in FIG. 3, a capacitance type touch panel 200 includes a first insulating layer 40; the first electrode portions 12 and the first lead-out wiring portions 14 that are disposed on the main surface at one side of the first insulating layer 40; the first transparent resin layer 16; the second electrode portions 20 and the second lead-out wiring portions 22; a second insulating layer 42; the second transparent resin layer 24; a protective substrate 44; the sealing layer 28; and the flexible printed wiring board 30.

The layers constituting the capacitance type touch panel 200 shown in FIG. 3 are the same as the layers constituting the capacitance type touch panel 100 shown in FIG. 1, except that they are disposed in different order. Therefore, the same constituents are marked with the same reference numerals, and the description thereof will not be repeated. The first insulating layer 40 and the second insulating layer 42 are the same layers as the insulating layer 10 shown in FIG. 1, and the definition thereof is as described above. The protective substrate 44 is the same layer as the first protective substrate 18 and the second protective substrate 26 shown in FIG. 1, and the definition thereof is as described above.

In FIG. 3, a plurality of first electrode portions 12 and a plurality of second electrode portions 20 are used similarly to FIG. 1, and the first electrode portions 12 and the second electrode portions 20 are disposed such that they are orthogonal to each other as shown in FIG. 1.

In addition, the first transparent resin layer 16 is disposed on the first electrode portions 12 and the first lead-out wiring portions 14 and on the second electrode portions 20 and the second lead-out wiring portions 22, such that the other end of each of the first lead-out wiring portions 14 and the second lead-out wiring portions 22 is exposed.

The capacitance type touch panel 200 shown in FIG. 3 corresponds to a capacitance type touch panel obtained in a manner in which a pair of electrode portions-equipped insulating layers composed of an insulating layer, and electrode portions and lead-out wiring portions that are disposed on the surface of the insulating layer; the insulating layers are stuck on each other via a transparent resin layer such that the electrode portions face each other. As shown in FIG. 3, the sealing layer 28 is disposed on the surface of the peripheral edge of the capacitance type touch panel 200 including the peripheral edge of the first transparent resin layer 16 exposed between the first insulating layer 40 and the second insulating layer 42, on the exposed surface of the first lead-out wiring portions 14 that is not covered with the first transparent resin layer 16 and the flexible printed wiring board 30, and on the exposed surface of the second lead-out wiring portions 22 that is not covered with the first transparent resin layer 16 and the flexible printed wiring board 30.

Third Embodiment

Figure 4:
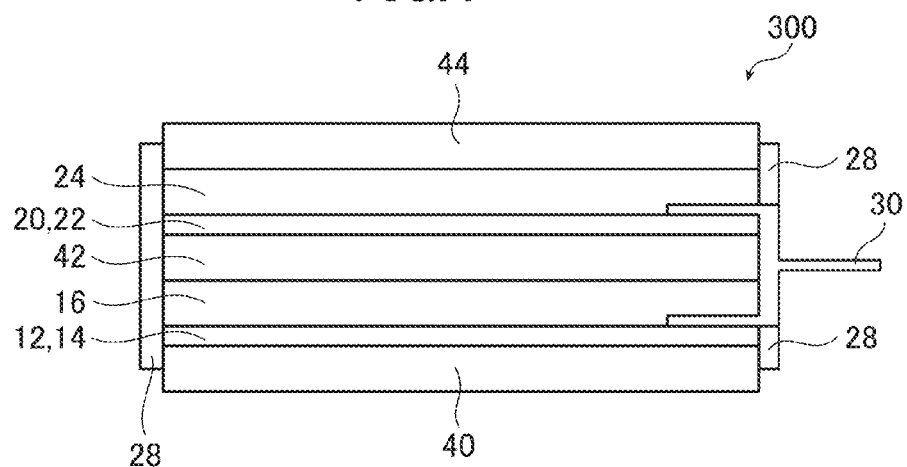
FIG. 4 is a cross-sectional view of a third embodiment of the capacitance type touch panel of the present invention.

FIG. 4 is a cross-sectional view of a third embodiment of the capacitance type touch panel of the present invention. Herein, FIG. 4 is merely a schematic view for making it easy to understand the layer constitution of a capacitance type touch panel 300, and it does not accurately show the disposition of each layer.

As shown in FIG. 4, the capacitance type touch panel 300 includes the first insulating layer 40; the first electrode portions 12 and the first lead-out wiring portions 14 that are disposed on the main surface of one side of the first insulating layer 40; the first transparent resin layer 16; the second insulating layer 42; the second electrode portions 20 and the second lead-out wiring portions 22; the second transparent resin layer 24; the protective substrate 44; the sealing layer 28; and the flexible printed wiring board 30.

The layers constituting the capacitance type touch panel 300 shown in FIG. 4 are the same as the layers constituting the capacitance type touch panel 200 shown in FIG. 3, except that they are disposed in different order. Therefore, the same constituents are marked with the same reference numerals, and the description thereof will not be repeated.

In FIG. 4, a plurality of first electrode portions 12 and a plurality of second electrode portions 20 are used similarly to FIG. 1, and the first electrode portions 12 and the second electrode portions 20 are disposed such that they are orthogonal to each other as shown in FIG. 1.

Moreover, the first transparent resin layer 16 is disposed on the first electrode portions 12 and the first lead-out wiring portions 14 such that the other end of the first lead-out wiring portions 14 is exposed. The second transparent resin layer 24 is disposed on the second electrode portions 20 and the second lead-out wiring portions 22 such that the other end of the second lead-out wiring portions 22 is exposed.

As shown in FIG. 4, the capacitance type touch panel 300 corresponds to a capacitance type touch panel obtained in a manner in which a pair of electrode portions-equipped insulating layers composed of an insulating layer, and electrode portions and lead-out wiring portions that are disposed on the surface of the insulating layer are prepared; the insulating layers are stuck on each other via a transparent resin layer such that the insulating layer of one of the electrode portions-equipped insulating layers and the electrode portions of the other electrode portions-equipped insulating layer face each other.

As shown in FIG. 4, the sealing layer 28 is disposed on the surface of the peripheral edge of the capacitance type touch panel 300 including the surface of peripheral edge of the first transparent resin layer 16 exposed between the first insulating layer 40 and the second insulating layer 42 and the surface of the peripheral edge of the second transparent resin layer 24 exposed between the second insulating layer 42 and the protective substrate 44, on the exposed surface of the first lead-out wiring portions 14 that is not covered with the first transparent resin layer 16 and the flexible printed wiring board 30, and on the exposed surface of the second lead-out wiring portions 22 that is not covered with the second transparent resin layer 24 and the flexible printed wiring board 30.

Fourth Embodiment

Figure 5A:
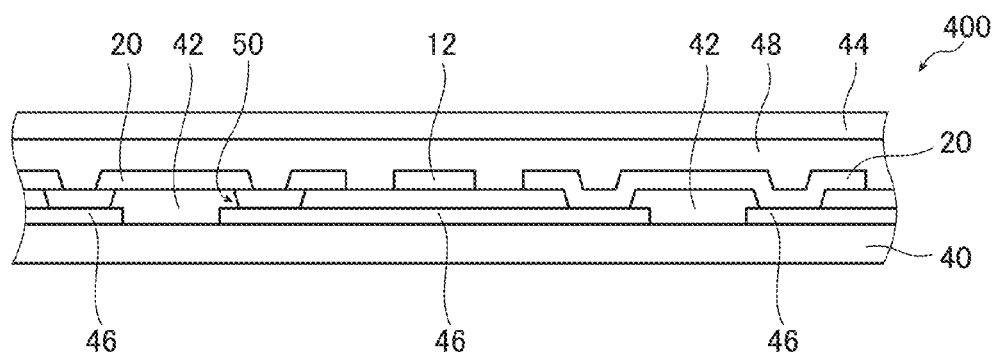
FIG. 5A is a cross-sectional view of a fourth embodiment of the capacitance type touch panel of the present invention.
Figure 5B:
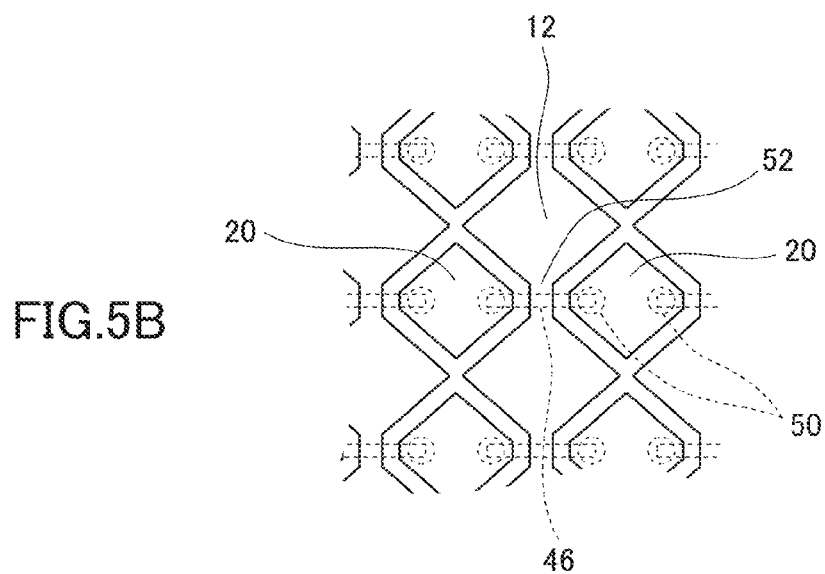
FIG. 5B is a partial plan view thereof.

FIGS. 5A and 5B are schematic views of a fourth embodiment of the capacitance type touch panel of the present invention. FIG. 5A is a cross-sectional view of a capacitance type touch panel 400, and FIG. 5B is a partial plan view thereof. Herein, FIGS. 5A and 5B are merely schematic views for making it easy to understand the layer constitution of the capacitance type touch panel 400, and they do not accurately show the disposition of each layer.

The capacitance type touch panel 400 includes, on the surface of the first insulating layer 40, a plurality of jumpers 46; the second insulating layer 42; the first electrode portions 12; first lead-out wiring portions not shown in the drawings; the second electrode portions 20; second lead-out wiring portions not shown in the drawings; a transparent resin layer 48; the protective substrate 44; the sealing layer 28 not shown in the drawings; and a flexible printed wiring board not shown in the drawings.

The transparent resin layer 48 is the same layer as the first transparent resin layer 16 and the second transparent resin layer 24, and the definition thereof is as described above.

The jumpers 46 are formed of a conductive material, and are arranged in the form of rows and columns in the X-axis direction and Y-axis direction on the surface of the first insulating layer 40. Each of the jumpers 46 is for connecting the second electrode portions 20, which line up in the X-axis direction, to each other in the X-axis direction. The jumpers 46 can be formed of a metal (MAM, APC, or the like), indium tin oxide (ITO), or a conductive polymer such as polyethylene dioxythiophene (PEDOT). Herein, MAM is an abbreviation of molybdenum (Mo)/aluminum (Al)/Mo and refers to a conductive material having a three-layered structure. Furthermore, APC is an alloy of silver/palladium/copper.

The second insulating layer 42 is formed by being laminated on the jumpers 46 and the first insulating layer 40 so as to cover the entire-surface of the jumpers 46 and the first insulating layer 40. In the second insulating layer 42, in portions in which the first electrode portions 12 overlap with the jumpers 46, through holes 50 reaching the surface of the jumpers 46 are provided.

As shown in FIG. 5B, the capacitance type touch panel 400 includes, within the same layer, the second electrode portions 20 that are intermittently arranged in the X-axis direction and in the Y-axis direction orthogonal to the X-axis direction; and the first electrode portions 12 which are arranged in the X-axis direction and the Y-axis direction and each of which is disposed between rows and columns of the second electrode portions 20. On the second insulating layer 42, the second electrode portions 20 lining up in the X-axis direction are not connected to each other in any of the X-axis direction and the Y-axis direction. However, they are electrically connected to the jumpers 46 on the first insulating layer 40 via the through holes 50. In contrast, the first electrode portions 12 are arranged in the X-axis direction and the Y-axis direction, and each of the first electrode portions 12 is disposed between the rows and columns of the second electrode portions 20. On the second, insulating layer 42, the first electrode portions 12 are connected to each other in the Y-axis direction via connection portions 52.

To the first electrode portions 12 and the second electrode portions 20, one end of each of the first lead-out wiring portions and one end of each of second lead-out wiring portions not shown in the drawings are connected.

The transparent resin layer 48 is disposed on the first electrode portions 12 and the second electrode portions 20, and on the first lead-out wiring portions and the second lead-out wiring portions not shown in the drawings, such that the other ends of the first lead-out wiring portions and the second lead-out wiring portions not shown in the drawings are exposed.

The protective substrate 44 is disposed on the transparent resin layer 48.

To the other ends of the first lead-out wiring portions and the second lead-out wiring portions, a flexible printed wiring board not shown in the drawings is connected.

The sealing layer not shown in the drawings is disposed on the surface of the peripheral edge of the transparent resin layer 48 exposed between the first insulating layer 40 and the protective substrate 44, and on the exposed surfaces of the first lead-out wiring portions and the second lead-out wiring portions not shown in the drawings that are not covered with the transparent resin layer 48 and the flexible printed wiring board.

Fifth Embodiment

Figure 6A:
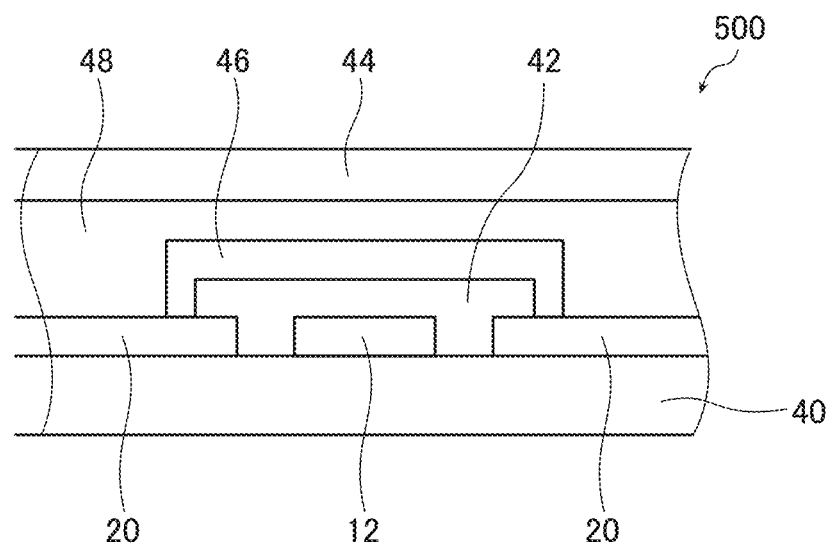
FIG. 6A is a cross-sectional view of a fifth embodiment of the capacitance type touch panel of the present invention.
Figure 6B:
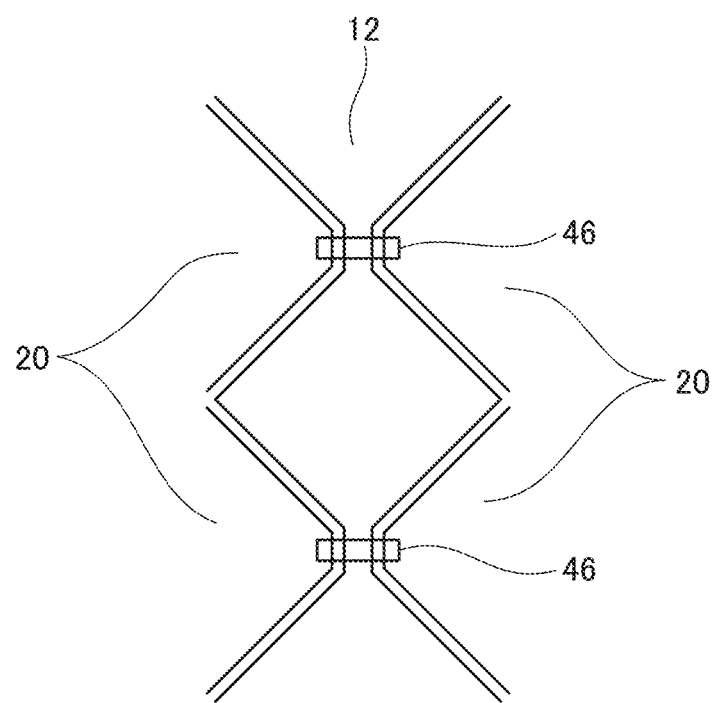
FIG. 6B is a partial plan view thereof.

FIGS. 6A and 6B are schematic views of a fifth embodiment of the capacitance type touch panel of the present invention. FIG. 6A is a cross-sectional view of a capacitance type touch panel 500, and FIG. 6B is a partial plan view thereof. Herein, FIGS. 6A and 6B are merely schematic views for making it easy to understand the layer constitution of the capacitance type touch panel 500, and they do not accurately show the disposition of each layer.

The capacitance type touch panel 500 includes, on the surface of the first insulating layer 40, the first electrode portions 12; first lead-out wiring portions not shown in the drawings; the second electrode portions 20; second lead-out wiring portions not shown in the drawings; the second insulating layer 42; the jumpers 46; the transparent resin layer 48; the protective substrate 44; a sealing layer not shown in the drawings; and a flexible printed wiring board not shown in the drawings.

As shown in FIG. 6B, the first electrode portions 12 are formed in a pattern on the first insulating layer 40 such that they are connected to each other in the Y-axis direction. The second insulating layer 42 is disposed to cover the portions in which the second electrode portions 20 cross the first electrode portions 12, and via the jumpers 46 provided in a state of striding over the second insulating layer 42, the second electrode portions 20 are electrically connected to each other in the X-axis direction.

To the first electrode portions 12 and the second electrode portions 20, one end of each of the first lead-out wiring portions and one end of each of the second lead-out wiring portions not shown in the drawings are connected.

The transparent resin layer 48 is disposed on the first electrode portions 12 and the second electrode portions 20, and on the first lead-out wiring portions and the second lead-out wiring portions not shown in the drawings, such that the other ends of the first lead-out wiring portions and the second lead-out wiring portions not shown in the drawings are exposed.

The protective substrate 44 is disposed on the transparent resin layer 48.

To the other ends of the first lead-out wiring portions and the second lead-out wiring portions, a flexible printed wiring board not shown in the drawings is connected.

The sealing layer not shown in the drawings is disposed on the surface of the peripheral edge of the transparent resin layer 48 exposed between the first insulating layer 40 and the protective substrate 44, and on the exposed surfaces of the first lead-out wiring portions and the second lead-out wiring portions not shown in the drawings that are not covered with the transparent resin layer 48 and the flexible printed wiring board.

Sixth Embodiment

Figure 7A:
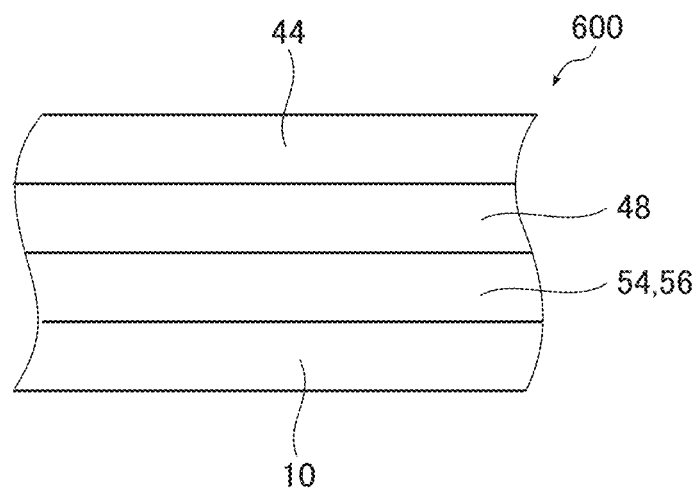
FIG. 7A is a cross-sectional view of a sixth embodiment of the capacitance type touch panel of the present invention.
Figure 7B:
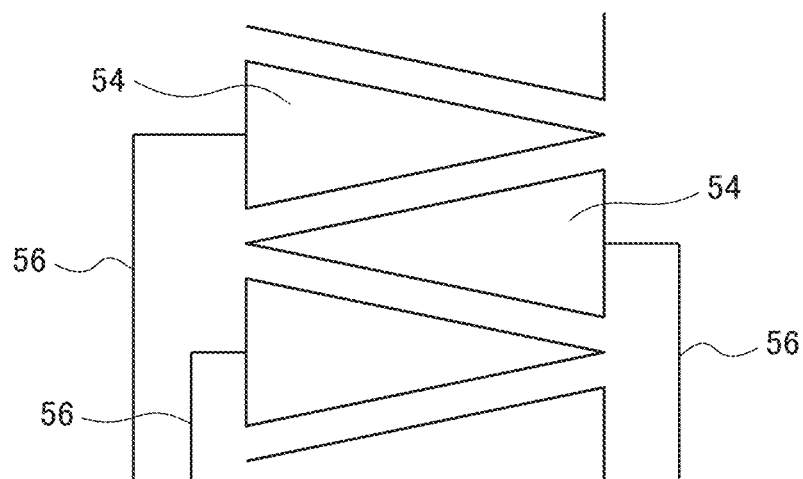
FIG. 7B is a partial plan view thereof.

FIGS. 7A and 7B are schematic views of a sixth embodiment of the capacitance type touch panel of the present invention. FIG. 7A is a cross-sectional view of a capacitance type touch panel 600 of the present invention, and FIG. 7B is a partial plan view thereof. Herein, FIGS. 7A and 7B are merely schematic views for making it easy to understand the layer constitution of the capacitance type touch panel 600, and they do not accurately show the disposition of each layer.

The capacitance type touch panel 600 includes, on the surface of the insulating layer 10, a plurality of electrode portions 54; a plurality of lead-out wiring portions 56; the transparent resin layer 48; the protective substrate 44; a sealing layer not shown in the drawings; and a flexible printed wiring board not shown in the drawings.

Herein, the electrode portions 54 are the same members as the first electrode portions 12 and the second electrode portions 20, and the definition thereof is as described above. The lead-out wiring portions 56 are the same members as the first lead-out wiring portions 14 and the second lead-out wiring portions 22, and the definition thereof is as described above.

As shown in FIG. 7B, each of the electrode portions 54 is in the form approximate to an isosceles triangle, and the plurality of electrode portions 54 is disposed on the insulating layer 10 such that they are positioned in a zigzag manner.

One end of each of the plurality of lead-out wiring portions 56 is connected to the corresponding electrode portion 54.

The transparent resin layer 48 is disposed on the electrode portions 54 and the lead-out wiring, portions 56, such that the other ends of the lead-out wiring portions 56 are exposed.

The protective substrate 44 is disposed on the transparent resin layer 48.

To the other ends of the lead-out wiring portions 56, a flexible printed wiring board not shown in the drawings is connected.

The sealing layer not shown in the drawings is disposed on the surface of the peripheral edge of the transparent resin layer 48 exposed between the insulating layer 10 and the protective substrate 44, and on the exposed surfaces of the lead-out wiring portions 56 that are not covered with the transparent resin layer 48 and the flexible printed wiring board.

The aforementioned capacitance type touch panels of the present invention can be applied to various purposes, and for example, they can be applied to an input device.

Figure 8A:
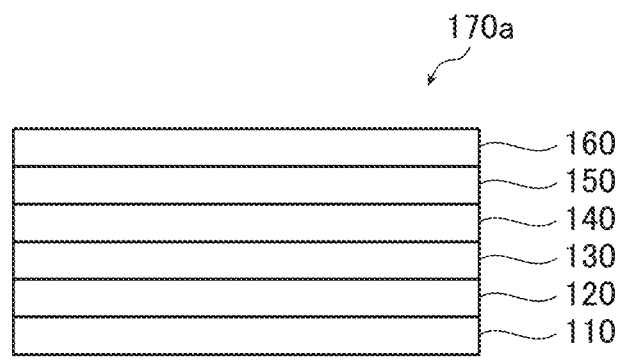
FIGS. 8A-8C are a cross-sectional view of an input device including the capacitance type touch panel of the present invention.
Figure 8B:
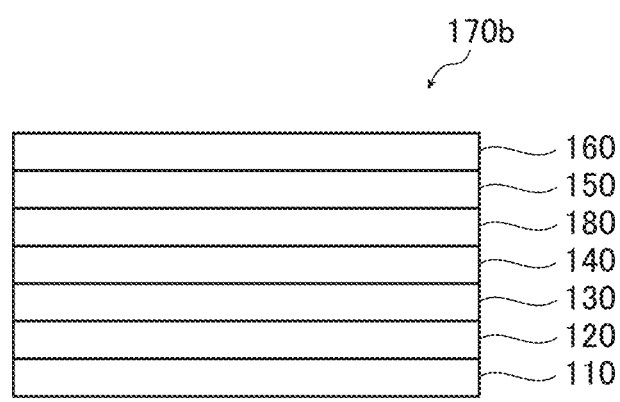
Figure 8C:
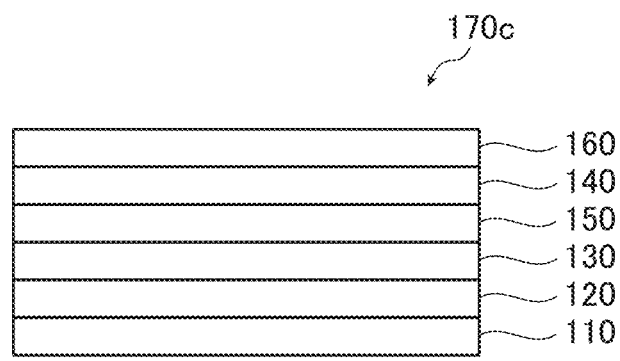

The constitution of the input device including the capacitance type touch panel of the present invention is not particularly limited, and examples of the constitution include the embodiments shown in FIGS. 8A, 8B, and 8C. The embodiment shown in FIG. 8A corresponds to an embodiment of a so-called outcell type, and examples thereof include an input device 170a including a backlight 110, a first polarizing plate 120, a liquid crystal display (LCD) 130, a second polarizing plate 140, a capacitance type touch panel 150 of the present invention, and a protective substrate 160 in this order. Herein, between the second polarizing plate 140 and the capacitance type touch panel 150, a spacer not shown in the drawing is disposed.

The embodiment of the input device is not limited to the embodiment of FIG. 8A. Examples of the embodiment include an input device 170b that is shown in FIG. 8B and includes the backlight 110, the first polarizing plate 120, the liquid crystal display (LCD) 130, the second polarizing plate 140, an adhesive layer 180, the capacitance type touch panel 150 of the present invention, and the protective substrate 160 in this order.

Examples of other embodiments of the input device also include an input device 170c that is shown in FIG. 8C and includes the backlight 110, the first polarizing plate 120, the liquid crystal display (LCD) 130, the capacitance type touch panel 150 of the present invention, the second polarizing plate 140, and the protective substrate 160 in this order.

Needless to say, the capacitance type touch panel of the present invention is not limited to the aforementioned embodiments, and various constituents can be adopted within a scope that does not depart from the gist of the present invention. Furthermore, the present invention can be used by being appropriately combined with the technologies disclosed in JP 2011-113149 A, JP 2011-129501 A, JP 2011-129112 A, JP 2011-134311 A, JP 2011-175628 A, and the like.

EXAMPLES

Hereinafter, based on examples, the present invention will be more specifically described, but the present invention is not limited thereto.

Example A

Example 1

Preparation of Silver Halide Emulsion

To the following Liquid 1 kept at 38° C. and pH 4.5, 90% of the following Liquid 2 and Liquid 3 were simultaneously added over 20 minutes while being stirred, thereby forming 0.16 μm of nuclear particles. Subsequently, the following Liquid 4 and Liquid 5 were added thereto over 8 minutes, and then the remaining 10% of the following Liquid 2 and Liquid 3 were added thereto over 2 minutes, such that the particles grew into 0.21 μm of particles. Thereafter, 0.15 g of potassium iodide was added thereto, the particles were allowed to mature for 5 minutes, and then the formation of particles was ended.

Liquid 1:

| | |
|---|---|
| Water | 750 ml |
| Gelatine | 9 g |
| Sodium chloride | 3 g |
| 1,3-Dimethylimidazolidine-2-thione | 20 mg |
| Sodium benzene thiosulfonate | 10 mg |
| Citric acid | 0.7 g |

Liquid 2:

| | |
|---|---|
| Water | 300 ml |
| Silver nitrate | 150 g |

Liquid 3:

| | |
|---|---|
| Water | 300 ml |
| Sodium chloride | 38 g |
| Potassium bromide | 32 g |
| Potassium hexachloroiridate(III) (0.005% KCl 20% aqueous solution) | 8 ml |
| Ammonium hexachlororhodate (0.001% NaCl 20% aqueous solution) | 10 ml |

Liquid 4:

| Water | 100 ml |
|---|---|
| Silver nitrate | 50 g |

Liquid 5:

| Water | 100 ml |
|---|---|
| Sodium chloride | 13 g |
| Potassium bromide | 11 g |
| Potassium ferrocyanide | 5 mg |

Thereafter, according to a common method, the resultant was washed with water by a flocculation method. Specifically, the resultant was cooled to 35° C., and pH thereof was reduced by using sulfuric acid until the silver halide was precipitated (pH was within a range of 3.6±0.2). Next, about 3 L of supernatant liquid was removed (first washing with water). Subsequently, 3 L of distilled water was added thereto, and then sulfuric acid was added thereto until the silver halide was precipitated. Then 3 L of supernatant liquid was removed again (second washing with water). The same operation as the second washing with water was repeated once (third washing with water), and then the step of washing with water and demineralization was ended. pH of the emulsion obtained after the washing with water and demineralization was adjusted to 6.4 and pAg thereof was adjusted to 7.5. Next, by adding 3.9 g of gelatine, 10 mg of sodium benzene thiosulfonate, 3 mg of sodium benzene thiosulfinate, 15 mg of sodium thiosulfate, and 10 mg of chloroauric acid to the emulsion, chemical sensitization was performed on the emulsion such that the emulsion exhibited optimal sensitivity at 55° C. Thereafter, 100 mg of 1,3,3a, 7-tetraazaindene as a stabilizer and 100 mg of Proxel (trade name, manufactured by ICI Co., Ltd.) as a preservative were added thereto. The finally obtained emulsion was an emulsion of cubic silver iodochlorobromide particles that contained 0.08 mol % of silver iodide and silver chlorobromide composed of silver chloride and silver bromide at a ratio of 70 mol % and 30 mol %, and had an average particle size of 0.22 μm and a coefficient of variation of 9%.

(Preparation of Composition for Forming Photosensitive Layer)

To the aforementioned emulsion, 1,3,3a,7-tetraazaindene in an amount of $1.2\times10^{-4}$ mol/mol Ag, hydroquinone in an amount of $1.2\times10^{-2}$ mol/mol Ag, citric acid in an amount of $3.0\times10^{-4}$ mol/mol Ag, and 2,4-dichloro-6-hydroxy-1,3,5-triazine sodium salt in an amount of 0.90 g/mol Ag were added. By using citric acid, pH of the coating liquid was adjusted to be 5.6, thereby obtaining a composition for forming a photosensitive layer.

(Step of Forming Photosensitive Layer)

A polyethylene terephthalate (PET) film having a thickness of 100 μm was subjected to a corona discharge treatment. Thereafter, on both surfaces of the PET film, a gelatine layer having a thickness of 0.1 μm was provided as an undercoat layer, and on the undercoat layer, an anti-halation layer, which has an optical density of about 1.0 and contains a dye that is bleached by alkali of a developer, was provided. The composition for forming a photosensitive layer was coated onto the anti-halation layer, and a gelatine layer having a thickness of 0.15 μm was provided thereon, thereby obtaining a PET film in which a photosensitive layer is formed on both surfaces thereof. The obtained film was named Film A. The formed photosensitive layer contains silver in an amount of 6.0 g/m$^2$ and gelatine in an amount of 1.0 g/m$^2$.

(Step of Exposure and Development)

Both surfaces of the Film A were subjected to exposure by using parallel light from a high-pressure mercury lamp as a light source, through a photomask in which a touch panel sensor pattern (first electrode portions and second electrode portions) and lead-out wiring portions (first lead-out wiring portions and second lead-out wiring portions) as shown in FIG. 1 were arranged, the film was developed by using the following developer and further subjected to a development treatment by using a fixing solution (trade name: N3X-R for CN16X, manufactured by FUJIFILM Corporation). Thereafter, the film was rinsed with pure water and dried, thereby obtaining a PET film in which an electrode pattern composed of thin Ag wires and a gelatine layer are formed on both surfaces thereof. The gelatine layer was formed between the thin Ag wires. The obtained film was named Film B. Herein, the L/S (line/space) of the lead-out wiring portions was 100 μm/100 μm.

(Composition of Developer)

The following compounds are contained in 1 L of developer.

| Hydroquinone | 0.037 mol/L |
|---|---|
| N-methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulphite | 0.187 mol/L |

On the surface (bottom surface) at one side of the film B obtained as above, OCA (#8146-4: thickness of 100 μm) manufactured by 3M Company and a hard coat film (G1SBF: thickness of 50 μm) manufactured by KIMOTO CO., LTD. were laminated in this order. Thereafter, OCA (#8146-4: thickness of 100 μm) manufactured by 3M Company was stuck on the surface (top surface) at the other side of the film B, thereby preparing a laminate. Herein, the portions of OCA and the hard coat film positioned on the other ends of the first lead-out wiring portions and the second lead-out wiring portions corresponding to a portion to which an FPC is to be pressure-bonded were cut out beforehand such that an FPC could be pressure-bonded thereto.

The external form of the laminate was trimmed such that it had the same size as a soda lime glass having a thickness of 0.7 mm approximate to a sensor size; an FPC was pressure-bonded thereto by using ACF (CP906AM-25AC) manufactured by Sony Chemicals Corporation; and the aforementioned soda lime glass was bonded to the top side thereof, thereby preparing a touch panel.

The touch panel prepared by the aforementioned method was dipped in FG-3030C-20 (manufactured by Fluoro Technology Co., Ltd., a fluorine-based surface treating agent) for 10 seconds and then pulled up under a condition of 50 mm/sec. Subsequently, the touch panel was dried at room temperature for 30 minutes, thereby obtaining a touch panel of which the entire surface was coated with a sealing layer formed of FG-3030C-20. The surface tension of FG-3030C-20 was 19 mN/m, and the viscosity thereof was 25 cps. Furthermore, the thickness of the formed sealing layer was 10 μm. Next, by using the obtained touch panel, a salt water spray test was performed based on JIS Z 2731 under a neutral condition. Thereafter, the touch panel was allowed to absorb moisture for 96 hours by being exposed to a high-temperature and high-humidity environment of 60° C./90%, and then the insulation resistance thereof was measured. The results are described in Table 1. Herein, before and after the salt water spray test, the values of insulation resistance between the lead-out wiring portions adjacent to each other was measured by using a tester probe, and the average thereof between all of the wiring portions was calculated.

The thickness of the sealing layer is an average thickness obtained by measuring thicknesses of twenty or more random sites by using an optical interference film thickness meter (manufactured by K-MAC, ST-2000DLXn) and calculating an arithmetic mean thereof.

The operation of the touch Panel, which had been allowed to absorb moisture for 96 hours, was confirmed and evaluated based on the following criteria. The results are shown in Table 1. In the following description, "lines" mean the first electrode portions and the second electrode portions.

"A": Operation was confirmed in all lines.
"B": Operation failure was confirmed in a portion of lines.
"C": Operation failure was confirmed in all lines.

(Evaluation of Yield)

Fifty pieces of touch panels prepared according to the above procedure were subjected to the salt water spray test, then allowed to absorb moisture for 96 hours, and left to stand in an environment of 60° C./90% for 240 hours. Thereafter, the operation of the touch panels was confirmed, and a proportion (%) of touch panels ranked "A" in which the operation was confirmed in all lines was evaluated by an equation of [(number of touch panels ranked "A"/50)×100]. The results are shown in Table 1. Herein, "lines" means first electrode portions and the second electrode portions.

Example 2

A touch panel was manufactured and evaluated in terms of various items according to the same procedure as in Example 1, except that after the touch panel prepared by the aforementioned method was dipped in FG-3030C-20 (manufactured by Fluoro Technology, a fluorine-based surface treating agent) for 10 seconds, it was pulled up under a condition of 30 mm/sec instead of a condition of 50 mm/sec. The results are summarized in Table 1.

Example 3

A touch panel was manufactured and evaluated in terms of various items according to the same procedure as in Example 1, except that after the touch panel prepared by the aforementioned method was dipped in FG-3030C-20 (manufactured by Fluoro Technology, a fluorine-based surface treating agent) for 10 seconds, it was pulled up under a condition of 20 mm/sec instead of a condition of 50 mm/sec. The results are summarized in Table 1.

Example 4

A touch panel was manufactured and evaluated in terms of various items according to the same procedure as in Example 1, except that after the touch panel prepared by the aforementioned method was dipped in FG-3030C-20 (manufactured by Fluoro Technology, a fluorine-based surface treating agent) for 10 seconds, it was pulled up a under condition of 10 mm/sec instead of a condition of 50 mm/sec. The results are summarized in Table 1.

Example 5

On the hard coat film and the glass surface of a touch panel prepared in the same manner as in Example 1, a protective film (PAC3-70, manufactured by Sun A. Kaken Co., Ltd.), which was cut in a size smaller than that of the touch panel by 1 mm, was stuck. In this state, the touch panel was dipped in FG-3030C-20 (manufactured by Fluoro Technology, a fluorine-based surface treating agent) for 10 seconds, then pulled up under a condition of 50 mm/sec, and dried at room temperature for 30 minutes. Then, the protective film was removed to obtain a touch panel in which a sealing layer formed of FG-3030C-20 was coated on the edge of the lateral side of the touch panel. Herein, the thickness of the sealing layer formed in the edge of the touch panel was 10 μm.

In the touch panel obtained in Example 5, the sealing layer is disposed in the portion (mainly, lateral edge) other than the hard coat film and the glass surface protected with the protective film.

Comparative Example 1

A touch panel was manufactured and evaluated in terms of various items according to the same procedure as in Example 1, except that the sealing layer was not prepared by skipping the step of dipping the touch panel in FG-3030C-20 in Example 1. The results are summarized in Table 1.

Comparative Example 2

A touch panel was manufactured and evaluated in terms of various items according to the same procedure as in Example 1, except that the thickness of the sealing layer was changed to 0.5 μm from 10 μm. The results are summarized in Table 1.

Comparative Example 3

A touch panel was manufactured and evaluated in terms of various items according to the same procedure as in Example 1, except that the entire surface of the touch panel was coated with an acrylic resin (UV-curable adhesive NOA76, manufactured by Norland Products, Inc.) instead of FG-3030C-20 by UV curing. The results are summarized in Table 1.

Comparative Example 4

A touch panel was manufactured and evaluated in terms of various items according to the same procedure as in Example 1, except that the entire surface of the touch panel was coated with an epoxy resin (Araldite Standard, manufactured by Ciba-Geygi K.K.) instead of FG-3030C-20 by UV curing. The results are summarized in Table 1.

Comparative Example 5

A touch panel was manufactured and evaluated in terms of various items according to the same procedure as in Example 1, except that the entire surface of the touch panel was coated with a silicone-based resin (HIPEC-R6101/Dow Corning Toray) instead of FG-3030C-20 by UV curing. The results are summarized in Table 1.

The moisture vapor transmittance of the sealing layers manufactured in Examples 1 to 5 and Comparative examples 2 to 5 were measured according to the aforementioned method. The results are summarized in Table 1.

TABLE 1

|  | Example 1 | Example 2 | Example 3 | Example 4 | Example 5 |
| --- | --- | --- | --- | --- | --- |
| Material of selaing layer | FG-3030C-20 | FG-3030C-20 | FG-3030C-20 | FG-3030C-20 | FG-3030C-20 |
| Thickness of sealing layer (μm) | 10 | 4 | 2 | 1 | 10 |
| Moisture vapor transmittance (g/m$^2$/24 h/atm)(25° C. 90% RH, 25 μm) | 10 | 10 | 10 | 10 | 10 |
| Insulation resistance (before salt water test) | >10 MΩ | >10 MΩ | >10 MΩ | >10 MΩ | >10 MΩ |
| Insulation resistance (after salt water test) | 1 MΩ | 1 MΩ | 800 kΩ | 300 kΩ | 1 MΩ |
| Operability after salt water test | A | A | A | A | A |
| Yield | 100% | 100% | 90% | 75% | 100% |

|  | Comparative Example 1 | Comparative Example 2 | Comparative Example 3 | Comparative Example 4 | Comparative Example 5 |
| --- | --- | --- | --- | --- | --- |
| Material of selaing layer | — | FG-3030C-20 | Acrylic resin | Epoxy resin | Silicone resin |
| Thickness of sealing layer (μm) | — | 0.5 | 10 | 10 | 10 |
| Moisture vapor transmittance (g/m$^2$/24 h/atm)(25° C. 90% RH, 25 μm) | — | 10 | 45 | 45 | 820 |
| Insulation resistance (before salt water test) | >10 MΩ | >10 MΩ | >10 MΩ | >10 MΩ | >10 MΩ |
| Insulation resistance (after salt water test) | 100 kΩ | 200 kΩ | 200 kΩ | 200 kΩ | 150 kΩ |
| Operability after salt water test | C | B | B | B | B |
| Yield | 0% | 30% | 20% | 25% | 18% |

In Table 1, ">10 MΩ" means that the insulation resistance is equal to or greater than 10 MΩ.

As shown in Table 1, in Examples 1 to 5 in which the capacitance type touch panel of the present invention was used, the insulation resistance was equal to or greater than 300 MΩ even after the salt water test, and operation failure did not occur after the salt water test. Particularly, it was confirmed that when the thickness of the sealing layer was equal to or greater than 2 μm (preferably equal to or greater than 4 μm), the yield increased, and better effects were obtained.

In contrast, in Comparative example 1 in which the sealing layer was not provided, the insulation resistance was greatly reduced after the salt water test, and operation failure occurred after the salt water test.

Moreover, in Comparative example 2 in which the thickness of the sealing layer was 0.5 μm and in Comparative examples 3 to 5 in which the sealing layer not exhibiting a predetermined moisture vapor transmittance was used, the insulation resistance was greatly reduced after the salt water test, and operation failure occurred after the salt water test.

Example B

Preparation of Silver Nanowire Dispersion

Silver nanowires were prepared according to the synthesis method described in the patent applied to the U.S. by Cambrios Technologies Corp (US 2008/0210052 A, Example 8). Detailed conditions thereof will be described below.

1.9 g of silver nitrate was dissolved in 115.79 g of 1,2-propylene glycol, thereby preparing a reaction liquid A. Furthermore, 1.99 g of polyvinyl pyrrolidone (manufactured by Sigma-Aldrich Co. LLC, a molecular weight of 55,000) was dissolved in 100 g of 1,2-propylene glycol, thereby preparing a reaction liquid B. Moreover, 0.288 g of tetrabutylammonium chloride (manufactured by Sigma-Aldrich Co. LLC.) was dissolved in 199.71 g of 1,2-propylene glycol, thereby preparing a reaction liquid C. 42.68 g of the reaction liquid B and 10 g of the reaction liquid C were put into a 300 ml three-neck flask made of glass, and the mixed liquid was stirred with a stirring blade made of Teflon in an environment of 25° C. at a stirring speed of 160 rpm. While the stirring was being continuously performed, 52.65 g of the reaction liquid A was added to the mixed liquid. Thereafter, the stirring speed was set to 320 rpm, and the mixed liquid was stirred for 15 minutes. After 15 minutes, the flask was dipped in an oil bath, and the temperature was regulated by heating the oil bath such that the liquid temperature in the flask became 80° C. After 20 hours elapsed from the beginning of heating, the reaction liquid is taken out of the flask. 45 g of the taken reaction liquid was put into a centrifugal sedimentation tube for centrifugation, 270 g of pure water was put into the tube, and centrifugation was performed for 15 minutes at 3,000 rpm. After the centrifugation, the supernatant was removed, a small amount of pure water was added to the sediment, and 9.6 g of silver nanowire dispersion was recovered.

Figure 9:
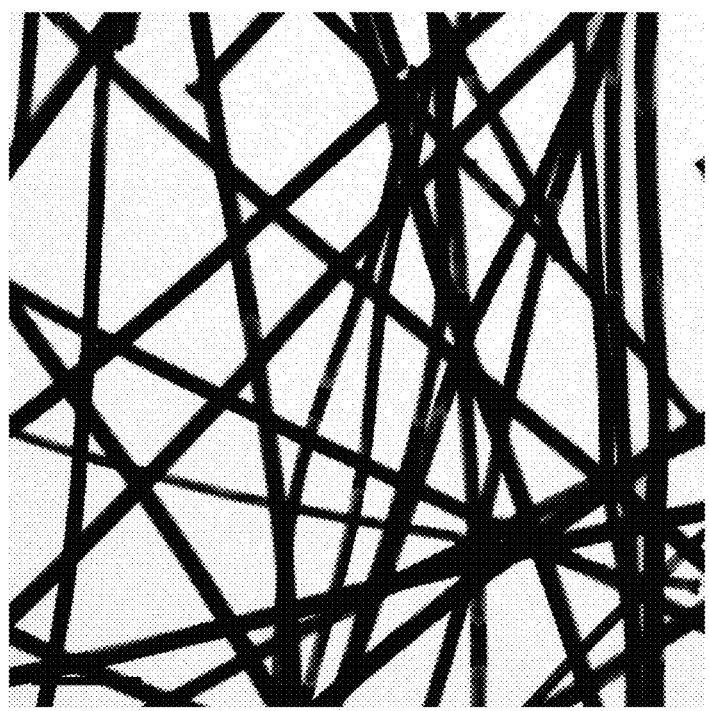
FIG. 9 is a transmission electron microscopic image of silver nanowires used in Example 11.
Figure 10A:
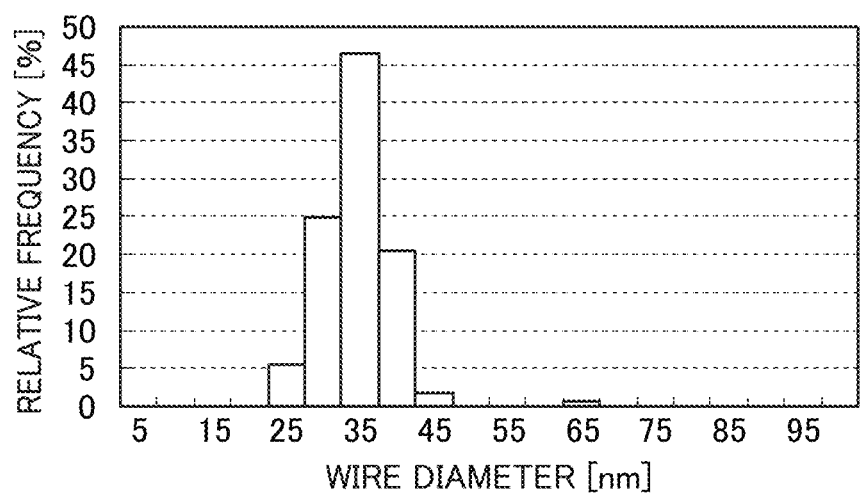
FIGS. 10A and 10B are histograms of the wire diameter and the wire length of the silver nanowires used in Example 11.
Figure 10B:
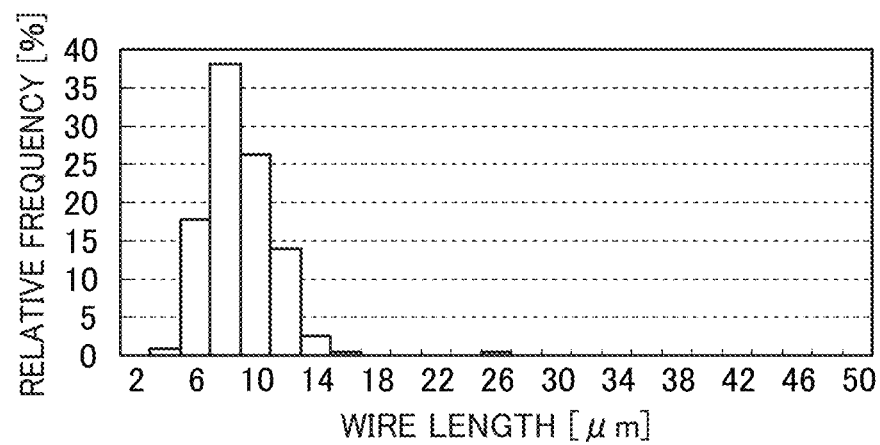

The shape of the obtained silver nanowires was observed with a transmission electron microscope. A transmission electron microscopic image of the silver nanowires is shown in FIG. 9. As a result of measuring the wire diameter and the wire length, the average wire diameter was 32.14 nm (number of wires measured: 161, coefficient of variation: 14.6%), and the average wire length was 7.92 μm (number of wires measured: 237, coefficient of variation: 29.3%). Histograms of the measured wire diameter and wire length are shown in FIGS. 10A and 10B.

(Preparation of Composition for Forming Conductive Layer)

A conductive layer was prepared according to the formulation of a coating liquid described in the patent applied the U.S. by Cambrios Technologies Corp (US 2008/0259262 A, Example 2). Detailed conditions thereof will be described below.

A coating liquid for forming a conductive layer composed of components in the following amount was prepared.

| | |
|---|---|
| Silver nanowires: | 0.2% by weight |
| Hydroxypropyl methylcellulose(HPMC): | 0.4% by weight |
| Triton-X100: | 0.025% by weight |
| Water: | 49.375% by weight |
| Isopropanol: | 50.0% by weight |

(Formation of Conductive Layer)

The prepared coating liquid was coated onto the surface of a polyethylene terephthalate film having a thickness of 125 μm by using a slit die coater on which a shim (thickness of 50 μm) made of sus was mounted. The film was then dried at 100° C. for 1 minute, thereby forming a "conductive layer A". As a result of measuring the value of surface resistance of the conductive layer A by a Loresta 4-terminal method, the surface resistance was 50 Ω/square.

(Preparation of Composition for Forming Protective Layer)

The following compounds were mixed and stirred together, thereby preparing a coating liquid for a protective layer.

| | |
|---|---|
| Follett GS-1000 (a linear alkyl-based resin, a solid content concentration of 30% by mass) manufactured by Soken Chemical & Engineering Co., Ltd.: | 500 g |
| Optool DAC (a solid content concentration of 20% by mass) manufactured by DAIKIN INDUSTRIES, ltd.: | 0.75 g |
| Ethyl acetate: | 1501.25 g |

<Formation of Protective Layer>

The prepared coating liquid for protective layer was coated onto the conductive layer A by using a slit die coater on which a shim (thickness of 50 μm) made of sus was mounted. The conductive layer A was then dried at 120° C. for 2 minutes to provide a protective layer of 800 nm, thereby forming a conductive laminate.

The conductive layer was patterned with reference to the general patterning method of conductive ITO films. Detailed conditions thereof will be described below.

(Formation of First Electrode Patterns (First Electrode Portions))

On the surface of the conductive laminate obtained by the aforementioned method, an etching mask was formed by a negative photoresist method, and then the laminate was dipped in an etching liquid dissolving silver, thereby forming conductive portions and non-conductive portions in the conductive layer.

[Formulation of Negative Resist]

Synthesis Example 1

Synthesis of Binder (A-1)

As monomer components constituting a copolymer, methacrylic acid (MAA; 7.79 g) and benzyl methacrylates (BzMA; 37.21 g) were used. By using 2,2'-azobis(isobutyronitrile) (AIBN; 0.5 g) as a radical polymerization initiator, the components were subjected to a polymerization reaction in a propylene glycol monomethyl ether acetate (PGMEA; 55.00 g) as a solvent, thereby obtaining a PGMEA solution (a solid content concentration: 45% by mass) of a binder (A-1) represented by the following formula. Herein, the polymerization temperature was regulated within a range of 60° C. to 100° C.

As a result of measuring the molecular weight of the binder (A-1) by gel permeation chromatography (GPC), the weight average molecular weight (Mw) thereof expressed in terms of polystyrene was 30,000, and a molecular weight distribution (Mw/Mn) was 2.21.

[Chem. 1]

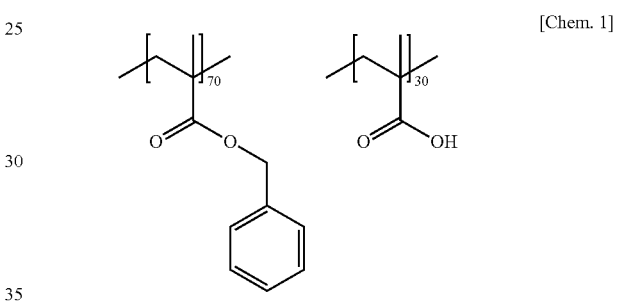

—Preparation of Photosensitive Composition (1)—

3.80 parts by mass of the binder (A-1) (a solid content of 40.0% by mass, a PGMEA solution), 1.59 parts by mass of KAYARAD DPHA (manufactured by Nippon Kayaku Co., Ltd.) as a photosensitive compound, 0.159 parts by mass of IRGACURE 379 (manufactured by Ciba Specialty Chemicals Inc.) as a photopolymerization initiator, 0.150 parts by mass of EHPE-3150 (manufactured by Daicel Corporation) as a crosslinking agent, 0.002 parts by mass of MEGAFAC F781F (manufactured by DIC Corporation), and 19.3 parts by mass of PGMEA were mixed and stirred together, thereby preparing a photosensitive composition (1).

—Step of Patterning Resist (Step of Providing Etching Mask Material)—

Onto the conductive laminate obtained as above, the photosensitive composition (1) was bar-coated such that the dry film thickness thereof became 5 μm, and then the substrate was dried in an oven at 150° C. for 5 minutes. The substrate was exposed to line i (365 nm) of a high-pressure mercury lamp through a glass mask for exposure at a dose of 400 mJ/cm$^2$ (an illuminance of 50 mW/cm$^2$).

The substrate after the exposure was subjected to shower development for 60 seconds by using a 1% aqueous sodium hydroxide solution (35° C.). The shower pressure was 0.08 MPa, and it took 30 seconds for a stripe pattern to appear. After being rinsed with pure water by shower, the substrate was dried at 50° C. for 1 minute, thereby preparing a resist pattern-equipped conductive laminate.

Herein, as the glass mask for exposure, a mask being able to form sensor electrodes of a capacitance type touch panel was used.

35

—Step of Etching—

The resist pattern-equipped conductive laminate was dipped in an etching liquid (nitric acid). An etching treatment was performed by dipping the laminate in an etching liquid, which was regulated to be at a temperature of 35° C., for 2 minutes, and then the laminate was rinsed with pure water by shower. Thereafter, water on the surface of the sample was blown away by using an air knife, and the sample was dried at 60° C. for 5 minutes, thereby preparing a resist pattern-equipped conductive laminate in pattern form.

—Step of Removing Resist—

The resist pattern-equipped conductive laminate in pattern form that had undergone etching was subjected to shower development for 75 seconds by using a 2.38% aqueous tetramethyl ammonium hydroxide solution kept at 35° C. The shower pressure was 3.0 MPa. After the sample was rinsed with pure water by shower, water on the surface of the sample was blown away by using an air knife, and the sample was dried at 60° C. for 5 minutes, thereby preparing a first electrode pattern member. As a result of measuring the value of inter-terminal resistance of the electrode portions of the prepared first electrode pattern member by using a tester, an intended value of resistance was obtained, and the value of insulation resistance between electrode portions adjacent to each other was equal to or greater than 10 MΩ.

(Formation of Second Electrode Patterns (Second Electrode Portions))

Thereafter, a second electrode pattern member was prepared by the same method as described above, except that this member was disposed in a direction perpendicular to the direction of the first electrode pattern member. As a result of measuring the value of inter-terminal resistance of the electrode portions of the obtained second electrode pattern member by using a tester, an intended value of resistance was obtained, and the value of insulation resistance between electrode portions adjacent to each other was equal to or greater than 10 MΩ.

(Formation of Peripheral Wirings)

Lead-out wirings (peripheral wirings), which were connected to the first electrode patterns in the first electrode pattern member and to the second electrode patterns in the second electrode pattern member formed by patterning as above, were prepared as below. That is, silver paste (Dotite FA-401CA, manufactured by FUJIKURAKASEI CO., LTD.) was printed by using a screen printer and then hardened by being subjected to an annealing treatment at 130° C. for 30 minutes, thereby forming lead-out wirings (peripheral wirings). Herein, L/S (line/space) of the lead-out wirings was 100 μm/100 μm, and the value of insulation resistance between lead-out wirings adjacent to each other was equal to or greater than 10 MΩ.

As a screen printing plate, a printing plate being able to form peripheral wirings for a capacitance type touch panel was used.

(Method for Preparing Touch Panel)

The surfaces of the electrode portions of the first electrode pattern member prepared by the aforementioned method were caused to face the surfaces of the electrodes portions of the second electrode pattern member prepared by the aforementioned method, and OCA (#8146-4: thickness of 100 μm) manufactured by 3M Company was disposed therebetween. In this state, the first electrode pattern member and the second electrode pattern member were stuck on each other, thereby obtaining a laminate. In the OCA used herein, a portion corresponding to the portion, to which an FPC was to be pressure-bonded, was cut out beforehand such that the other ends of the lead-out wirings of the first electrode pattern member and the second electrode pattern member were exposed, thereby making it possible to pressure-bond an FPC. The external form of the laminate was trimmed in the same size as that of soda lime glass having a thickness of 0.7 mm approximate to a sensor size, and an FPC was pressure-bonded to the laminate by using ACF (CP906AM-25AC) manufactured by Sony Chemicals Corporation. Thereafter, on the polyethylene terephthalate film of the first electrode pattern member in the laminate, OCA (#8146-4: thickness of 100 μm) manufactured by 3M Company and a hard coat film (G1SBF: thickness of 50 μm) manufactured by KIMOTO CO., LTD. were laminated in this order. Furthermore, on the polyethylene terephthalate film of the second electrode pattern member in the laminate, OCA (#8146-4: thickness of 100 μm) manufactured by 3M Company and soda lime glass were stuck.

Example 11

The touch panel prepared by the aforementioned method was dipped in FG-3030C-20 (manufactured by Fluoro Technology, a fluorine-based surface treating agent) for 10 seconds and then pulled up under a condition of 50 mm/min. Subsequently, the touch panel was dried at room temperature for 30 minutes, thereby obtaining a touch panel of which the entire surface was coated with a sealing layer formed of FG-3030C-20. Next, by using the touch panel, a salt water spray test was performed based on JIS Z 2731 under a neutral condition. Thereafter, the touch panel was allowed to absorb moisture for 96 hours by being exposed to a high-temperature and high-humidity environment of 60° C./90%, and then the insulation resistance thereof was measured. The results are described in Table 2. Herein, before and after the salt water spray test, the values of insulation resistance between the lead-out wiring portions adjacent to each other was measured by using a tester probe, and the average thereof between all of the wiring portions was calculated.

The operation of the touch panel, which had been allowed to absorb moisture for 96 hours, was confirmed and evaluated based on the following criteria. The results are shown in Table 2. In the following description, "lines" mean the first electrode portions and the second electrode portions.

"A": Operation was confirmed in all lines.

"B": Operation failure was confirmed in a portion of lines.

"C": Operation failure was confirmed in all lines.

Example 12

A touch panel was manufactured and evaluated in terms of various items according to the same procedure as in Example 11, except that after the touch panel prepared by the aforementioned method was dipped in FG-3030C-20 (manufactured by Fluoro Technology, a fluorine-based surface treating agent) for 10 seconds, it was pulled up under a condition of 30 mm/sec instead of a condition of 50 mm/sec. The results are summarized in Table 2.

Example 13

A touch panel was manufactured and evaluated in terms of various items according to the same procedure as in Example 11, except that after the touch panel prepared by the aforementioned method was dipped in FG-3030C-20 (manufactured by Fluoro Technology, a fluorine-based surface treating agent) for 10 seconds, it was pulled up under a condition of 20 mm/sec instead of a condition of 50 mm/sec. The results are summarized in Table 2.

Example 14

A touch panel was manufactured and evaluated in terms of various items according to the same procedure as in Example 11, except that after the touch panel prepared by the aforementioned method was dipped in FG-3030C-20 (manufactured by Fluoro Technology, a fluorine-based surface treating agent) for 10 seconds, it was pulled up under a condition of 10 mm/sec instead of a condition of 50 mm/sec. The results are summarized in Table 2.

Comparative Example 11

A touch panel was manufactured and evaluated in terms of various items according to the same procedure as in Example 11, except that the sealing layer was not prepared by skipping the step of dipping the touch panel in FG-3030C-20 in Example 11. The results are summarized in Table 2.

Comparative Example 12

In a state in which the end surface of the touch panel prepared by the aforementioned method was masked, the touch panel was dipped in FG-3030C-20 (manufactured by Fluoro Technology, a fluorine-based surface treating agent) for 10 seconds, then pulled under a condition of 2 cm/sec, and dried at room temperature for 30 seconds, thereby obtaining a structure in which only the portion of ACF/FPC was coated with FG-3030C-20. Thereafter, the structure was evaluated in the same manner as in Example 11. The results are described in Table 2.

In the structure, the sealing layer (FG-3030C-20) was disposed only on the exposed surfaces of the lead-out wiring portions, and the sealing layer (FG-3030C-20) was not disposed on a portion of the exposed lateral surface of the transparent resin layer (OCA).

Comparative Example 13

A touch panel was manufactured and evaluated in terms of various items according to the same procedure as in Example 11, except that after the touch panel prepared by the aforementioned method was dipped in FG-3030C-20 (manufactured by Fluoro Technology, a fluorine-based surface treating agent) for 10 seconds, it was pulled up under a condition of 5 mm/sec instead of a condition of 50 mm/sec. The results are summarized in Table 2.

TABLE 2

|  | Example 11 | Example 12 | Example 13 | Example 14 | Comparative Example 11 | Comparative Example 12 | Comparative Example 13 |
|---|---|---|---|---|---|---|---|
| Material of sealing layer | FG-3030C-20 | FG-3030C-20 | FG-3030C-20 | FG-3030C-20 | — | FG-3030C-20 | FG-3030C-20 |
| Thickness of sealing layer(μm) | 10 | 4 | 2 | 1 | — | 10 *Only the portion of FPC/ACF was sealed | 0.5 |
| Moisture vapor transmittance (g/m²/24 h/atm)(25° C. 90% RH, 25 μm) | 10 | 10 | 10 | 10 | — | 10 | 10 |
| Insulation resistance (before salt water test) | >10 MΩ | >10 MΩ | >10 MΩ | >10 MΩ | >10 MΩ | >10 MΩ | >10 MΩ |
| Insulation resistance (after salt water test) | 1 MΩ | 1 MΩ | 700 kΩ | 300 kΩ | 100 kΩ | 200 kΩ | 200 kΩ |
| Operability after salt water test | A | A | A | A | C | B | B |
| Yield | 100% | 100% | 88% | 70% | 0% | 15% | 25% |

In Table 2, ">10 MΩ" means that the insulation resistance is equal to or greater than 10 MΩ.

As shown in Table 2, in Examples 11 to 14 in which the capacitance type touch panel of the present invention was used, the insulation resistance was equal to or greater than 300 MΩ even after the salt water test, and operation failure did not occur after the salt water test. Particularly, it was confirmed that when the thickness of the sealing layer was equal to or greater than 2 μm (preferably equal to or greater than 4 μm), the yield increased, and better effects were obtained.

In contrast, in Comparative example 11 in which the sealing layer was not provided, the insulation resistance was greatly reduced after the salt water test, and operation failure occurred after the salt water test.

Moreover, in Comparative example 12 in which the sealing layer was not provided on the exposed portion of the transparent resin layer and in Comparative example 13 in which the thickness of the sealing layer was 0.5 μm, the insulation resistance was greatly reduced after the salt water test, and operation failure occurred after the salt water test.

Example C

Formation of First Electrode Patterns (First Electrode Portions)

On the surface of an ITO transparent conductive material (manufactured by Sigma-Aldrich Co. LLC, 639281-1EA, 100 Ω/square), an etching mask material was formed by a negative photoresist method, and the resultant was dipped in an etching liquid dissolving ITO, thereby forming conductive portions and non-conductive portions in the conductive layer.

—Step of Patterning Resist (Step of Providing Etching Mask Material)—

Onto the surface of the ITO transparent conductive material, the photosensitive composition (1) prepared in Example B was bar-coated such that the dry film thickness thereof became 5 µm, and then the substrate was dried in an oven at 150° C. for 5 minutes. The substrate was exposed to line i (365 nm) of a high-pressure mercury lamp through a glass mask for exposure at a dose of 400 mJ/cm$^2$ (an illuminance of 50 mW/cm$^2$).

The substrate after the exposure was subjected to shower development for 60 seconds by using a 1% aqueous sodium hydroxide solution (35° C.). The shower pressure was 0.08 MPa, and it took 30 seconds for a stripe pattern to appear. After being rinsed with pure water by shower, the substrate was dried at 50° C. for 1 minute, thereby preparing a resist pattern-equipped conductive member.

Herein, as the glass mask for exposure, a mask being able to form sensor electrodes of a capacitance type touch panel was used.

—Step of Etching—

The resist pattern-equipped conductive member was dipped in an etching liquid for ITO. An etching treatment was performed by dipping the member in an etching liquid, which was regulated to be at a temperature of 35° C., for 2 minutes, and then the member was rinsed with pure water by shower. Thereafter, water on the surface of the sample was blown away by using an air knife, and the sample was dried at 60° C. for 5 minutes, thereby preparing a resist pattern-equipped conductive member in the form of pattern.

—Step of Removing Resist—

The resist pattern-equipped conductive member in the form of pattern that had undergone etching was subjected to shower development for 75 seconds by using a 2.38% aqueous tetramethyl ammonium hydroxide solution kept at 35° C. The shower pressure was 3.0 MPa. After the sample was rinsed with pure water by shower, water on the surface of the sample was blown away by using an air knife, and the sample was dried at 60° C. for 5 minutes, thereby preparing a first electrode pattern member. As a result of measuring the value of inter-terminal resistance of the electrode portions of the prepared first electrode pattern member by using a tester, an intended value of resistance was obtained, and the value of insulation resistance between electrode portions adjacent to each other was equal to or greater than 10 MΩ.

(Formation of Second Electrode Patterns (Second Electrode Portions))

Thereafter, a second electrode pattern member was prepared by the same method as described above, except that this member was disposed in a direction perpendicular to the direction of the first electrode pattern member. As a result of measuring the value of inter-terminal resistance of the electrode portions of the obtained second electrode pattern member by using a tester, an intended value of resistance was obtained, and the value of insulation resistance between electrode portions adjacent to each other was equal to or greater than 10 MΩ.

(Formation of Peripheral Wirings)

Lead-out wirings (peripheral wirings), which were connected to the first electrode patterns in the first electrode pattern member and to the second electrode patterns in the second electrode pattern member formed by patterning as above, were prepared as below. That is, silver paste (Dotite FA-401CA, manufactured by FUJIKURAKASEI CO., LTD.) was printed by using a screen printer and then hardened by being subjected to an annealing treatment at 130° C. for 30 minutes, thereby forming lead-out wirings (peripheral wirings). Herein, L/S (line/space) of the lead-out wirings was 100 µm/100 µm, and the value of insulation resistance between lead-out wirings adjacent to each other was equal to or greater than 10 MΩ.

As a screen printing plate, a printing plate being able to form peripheral wirings for a capacitance type touch panel was used.

(Method for Preparing Touch Panel)

The surfaces of the electrodes of the first electrode pattern member prepared by the aforementioned method were caused to face the surfaces of the electrodes of the second electrode pattern member prepared by the aforementioned method, and OCA (#8146-4: thickness of 100 µm) manufactured by 3M Company was disposed therebetween. In this state, the first electrode pattern member and the second electrode pattern member were stuck on each other, thereby obtaining a laminate. In the OCA used herein, a portion corresponding to the portion, to which an FPC was to be pressure-bonded, was cut out beforehand such that the other ends of the lead-out wirings of the first electrode pattern member and the second electrode pattern member were exposed, thereby making it possible to pressure-bond an FPC. The external form of the laminate was trimmed in the same size as that of soda lime glass having a thickness of 0.7 mm approximate to a sensor size, and an FPC was pressure-bonded to the laminate by using ACF (CP906AM-25AC) manufactured by Sony Chemicals Corporation. Thereafter, on the surface of the side of the first electrode pattern member in the laminate, OCA (#8146-4: thickness of 100 µm) manufactured by 3M Company and a hard coat film (G1SBF: thickness of 50 µm) manufactured by KIMOTO CO., LTD. were laminated in this order. Furthermore, on the surface of the side of the second electrode pattern member in the laminate, OCA (#8146-4: thickness of 100 µm) manufactured by 3M Company and soda lime glass were stuck.

<Sealing Method>

Example 21

The touch panel prepared by the aforementioned method was dipped in FG-3030C-20 (manufactured by Fluoro Technology, a fluorine-based surface treating agent) for 10 seconds and then pulled up under a condition of 50 mm/sec. Subsequently, the touch panel was dried at room temperature for 30 minutes, thereby obtaining a touch panel of which the entire surface was coated with a sealing layer formed of FG-3030C-20. Thereafter, by using the obtained touch panel, a salt water spray test was performed based on JIS Z 2731 under a neutral condition. Next, the touch panel was allowed to absorb moisture for 96 hours by being exposed to a high-temperature and high-humidity environment of 60° C./90%, and then the insulation resistance thereof was measured. The results are described in Table 3. Herein, before and after the salt water spray test, the values of insulation resistance between the lead-out wiring portions adjacent to each other was measured by using a tester probe, and the average thereof between all of the wiring portions was calculated.

The operation of the touch panel, which had been allowed to absorb moisture for 96 hours, was confirmed and evaluated based on the following criteria. The results are shown in Table 3. In the following description, "lines" mean the first electrode portions and the second electrode portions.

"A": Operation was confirmed in all lines.

"B": Operation failure was confirmed in a portion of lines.

"C": Operation failure was confirmed in all lines.

Example 22

A touch panel was manufactured and evaluated in terms of various items according to the same procedure as in Example 21, except that after the touch panel prepared by the aforementioned method was dipped in FG-3030C-20 (manufactured by Fluoro Technology, a fluorine-based surface treating agent) for 10 seconds, it was pulled up under a condition of 30 mm/sec instead of a condition of 50 mm/sec. The results are summarized in Table 3.

Comparative Example 21

A touch panel was manufactured and evaluated in terms of various items according to the same procedure as in Example 21, except that the sealing layer was not prepared by skipping the step of dipping the touch panel in FG-30300-20 in Example 21. The results are summarized in Table 3.

Comparative Example 22

A touch panel was manufactured and evaluated in terms of various items according to the same procedure as in Example 21, except that after the touch panel prepared by the aforementioned method was dipped in FG-3030C-20 (manufactured by Fluoro Technology, a fluorine-based surface treating agent) for 10 seconds, it was pulled up under a condition of 5 mm/sec instead of a condition of 50 mm/sec. The results are summarized in Table 3.

TABLE 3

|  | Example 21 | Example 22 | Comparative Example 21 | Comparative Example 22 |
|---|---|---|---|---|
| Material of selaing layer | FG-3030C-20 | FG-3030C-20 | — | FG-3030C-20 |
| Thickness of sealing layer(μm) | 10 | 4 | — | 0.5 |
| Moisture vapor transmittance (g/m²/24 h/atm)(25° C. 90% RH, 25 μm) | 10 | 10 | — | 10 |
| Insulation resistance (before salt water test) | >10 MΩ | >10 MΩ | >10 MΩ | >10 MΩ |
| Insulation resistance (after salt water test) | 1 MΩ | 1 MΩ | 100 kΩ | 200 kΩ |
| Operability after salt water test | A | A | C | B |
| Yield | 100% | 100% | 0% | 22% |

In Table 3, ">10 MΩ" means that the insulation resistance is equal to or greater than 10 MΩ.

As shown in Table 3, in Examples 21 and 22 in which the capacitance type touch panel of the present invention was used, the insulation resistance was equal to or greater than 300 MΩ even after the salt water test, and operation failure did not occur after the salt water test.

In contrast, in Comparative example 21 in which the sealing layer was not provided, the insulation resistance was greatly reduced after the salt water test, and operation failure occurred after the salt water test.

Moreover, in Comparative example 22 in which the thickness of the sealing layer was 0.5 μm, the insulation resistance was greatly reduced after the salt water test, and operation failure occurred after the salt water test.

What is claimed is:

1. A capacitance type touch panel comprising:
   an insulating layer;
   a plurality of electrode portions disposed on the main surface of at least one side of the insulating layer;
   a plurality of lead-out wiring portions which is disposed on the main surface of the insulating layer in which the plurality of electrode portions is disposed, and in each of which one end is connected to the corresponding electrode portion;
   a transparent resin layer disposed on the electrode portions and the lead-out wiring portions, such that the other end of each of the lead-out wiring portions is exposed; and
   a substrate disposed on the transparent resin layer,
   wherein at least on the surface of the peripheral edge of the transparent resin layer exposed between the insulating layer and the substrate and on the exposed surface of the lead-out wiring portions, a sealing layer is disposed, and
   the sealing layer has a moisture vapor transmittance equal to or less than 20 g/m²/24 h/atm (25° C., 90% RH, 25 μm), and has a thickness equal to or greater than 1.0 μm.

2. The capacitance type touch panel according to claim 1, comprising:
   an insulating layer;
   a plurality of first electrode portions disposed on the surface of the insulating layer;
   a plurality of first lead-out wiring portions which is disposed on the surface of the insulating layer and in each of which one end is connected to the corresponding first electrode portion;
   a first transparent resin layer disposed on the first electrode portions and the first lead-out wiring portions, such that the other end of each of the first lead-cut wiring portions is exposed;
   a first protective substrate disposed on the first transparent resin layer;
   a plurality of second electrode portions disposed on the rear surface of the insulating layer;
   a plurality of second lead-out wiring portions which is disposed on the rear surface of the insulating layer and in each of which one end is connected to the corresponding second electrode portion;
   a second transparent resin layer disposed on the second electrode portions and the second lead-out wiring portions, such that the other end of each of the second lead-out wiring portions is exposed; and
   a second protective substrate disposed on the second transparent resin layer,
   wherein at least on the surface of the peripheral edge of the first transparent resin layer exposed between the insulating layer and the first protective substrate, on the surface of the peripheral edge of the second transparent resin layer exposed between the insulating layer and the second protective substrate, and on the exposed surfaces of the first lead-out wiring portions and the second lead-out wiring portions, a sealing layer is disposed, and the sealing layer has a moisture vapor transmittance equal to or less than 20 g/m$^2$/24 h/atm (25° C., 90% RH, 25 μm) and a thickness equal to or greater than 1.0 μm.

3. A manufacturing method of the capacitance type touch panel according to claim 2, comprising a step of:

bringing a laminate into contact with a sealant-containing composition for forming a sealing layer, wherein the laminate includes an insulating layer, a plurality of first electrode portions disposed on the surface of the insulating layer, a plurality of first lead-out wiring portions which is disposed on the surface of the insulating layer and in each of which one end is connected to the corresponding first electrode portion, a first transparent resin layer disposed on the first electrode portions and the first lead-out wiring portions such that the other end of each of the first lead-out wiring portions is exposed, a first protective substrate disposed on the first transparent resin layer, a first protective film removably disposed on the main surface of the first protective substrate, a plurality of second electrode portions disposed on the rear surface of the insulating layer, a plurality of second wiring portions which is disposed on the rear surface of the insulating layer and in each of which one end is connected to the corresponding second electrode portion, a second transparent resin layer disposed on the second electrode portions and the second lead-out wiring portions such that the other end of each of the second lead-out wiring portions is exposed, a second protective substrate disposed on the second transparent resin layer, and a second protective film removably disposed on the main surface of the second protective substrate.

4. The manufacturing method of the capacitance type touch panel according to claim 3, wherein the laminate is brought into contact with the composition by a spray treatment, a dipping treatment, or dispensing.

5. The capacitance type touch panel according to claim 2, wherein the sealing layer contains a fluorine-based resin.

6. The capacitance type touch panel according to claim 2, wherein the sealing layer contains fluorine atoms in an amount equal to or greater than 1% by mass.

7. The capacitance type touch panel according to claim 2, wherein the sealing layer is a layer formed of a composition for forming a sealing layer, and the composition for forming a sealing layer has a surface tension equal to or less than 20 mN/m and a viscosity equal to or less than 100 cps.

8. An input device comprising the capacitance type touch panel according to claim 2.

9. The capacitance type touch panel according to claim 1, wherein the sealing layer contains a fluorine-based resin.

10. An input device comprising the capacitance type touch panel according to claim 9.

11. The capacitance type touch panel according to claim 1, wherein the sealing layer contains fluorine atoms in an amount equal to or greater than 1% by mass.

12. An input device comprising the capacitance type touch panel according to claim 11.

13. The capacitance type touch panel according to claim 1, wherein the sealing layer is a layer formed of a composition for forming a sealing layer, and the composition for forming a sealing layer has a surface tension equal to or less than 20 mN/m and a viscosity equal to or less than 100 cps.

14. An input device comprising the capacitance type touch panel according to claim 1.

15. A capacitance type touch panel comprising:

an insulating layer;

a plurality of electrode portions disposed on the main surface of at least one side of the insulating layer, a plurality of lead-out wiring portions which is disposed on the main surface of the insulating layer in which the plurality of electrode portions is disposed, and in each of which one end is connected to the corresponding electrode portion;

a transparent resin layer disposed on the electrode portions and the lead-out wiring portions, such that the other end of each of the lead-out wiring portions is exposed; and a substrate disposed on the transparent resin layer, wherein a direct current resistance between the lead-out wiring portions adjacent to each other that is measured 24 hours after a salt water spray test of JIS Z 2371 is equal to or a greater than 300 kΩ.

16. The capacitance type touch panel according to claim 15, wherein at least on the surface of the peripheral edge of the transparent resin layer exposed between the insulating layer and the substrate and on the exposed surface of the lead-out wiring portions, a sealing layer is disposed, and the sealing layer has a moisture vapor transmittance equal to or less than 20 g/m$^2$/24 h/atm (25° C., 90% RH, 25 μm) and a thickness equal to or greater than 1.0 μm.

17. The capacitance type touch panel according to claim 16, wherein the lead-out wiring portions contain silver.

18. The capacitance type touch panel according to claim 15, wherein the lead-out wiring portions contain silver.

19. The capacitance type touch panel according to claim 15, wherein the electrode portions are transparent electrode portions comprising a metal oxide.

20. The capacitance type touch panel according to claim 15, wherein the electrode portions are transparent electrode portions comprising metal nanowires having an average wire diameter equal to or less than 50 nm and an average wire length equal to or greater than 5 μm.

* * * * *